US012230863B2

(12) United States Patent
Larson et al.

(10) Patent No.: US 12,230,863 B2
(45) Date of Patent: Feb. 18, 2025

(54) APPARATUSES FOR MOUNTING AN ANTENNA ASSEMBLY

(71) Applicant: Viasat, Inc., Carlsbad, CA (US)

(72) Inventors: Kenneth J. Larson, Escondido, CA (US); Steven L. Shrinkle, San Diego, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

(21) Appl. No.: 17/399,590

(22) Filed: Aug. 11, 2021

(65) Prior Publication Data

US 2021/0376446 A1   Dec. 2, 2021

Related U.S. Application Data

(63) Continuation of application No. 16/255,288, filed on Jan. 23, 2019, now Pat. No. 11,121,448, which is a
(Continued)

(51) Int. Cl.
*H01Q 1/18* (2006.01)
*F16F 15/00* (2006.01)
(Continued)

(52) U.S. Cl.
CPC ............... *H01Q 1/18* (2013.01); *F16F 15/00* (2013.01); *H01Q 1/125* (2013.01); *H01Q 3/08* (2013.01); *F16F 15/133* (2013.01)

(58) Field of Classification Search
CPC .. H01Q 1/18; H01Q 1/125; H01Q 3/08; F16F 15/00
See application file for complete search history.

(56) References Cited

U.S. PATENT DOCUMENTS

| 2,585,579 A | 2/1952 | Norden |
| 2,761,638 A | 9/1956 | Getline |

(Continued)

FOREIGN PATENT DOCUMENTS

| DE | 102006054274 B3 | 11/2006 |
| EP | 2650962 A1 | 4/2012 |

(Continued)

OTHER PUBLICATIONS

Brancati, et al., "Experimental Investigation of the Performances of a WRS-BTU Seismic Isolator", Proceedings of the World Congress on Engineering 2013 vol. III, WCE 2013, Jul. 3-5, 2013, London, UK.
(Continued)

*Primary Examiner* — Ricardo I Magallanes
(74) *Attorney, Agent, or Firm* — Holland & Hart LLP

(57) ABSTRACT

Methods, systems, and devices are described for mounting an antenna assembly to a vehicle, whereby rotational degrees of freedom between the antenna assembly and the vehicle are constrained. For example, an antenna mount may employ an intermediate structure between the antenna assembly and the vehicle. In various examples, the intermediate structure may be coupled with one of the vehicle or the antenna assembly by a linear coupling, and the intermediate structure may be coupled with the other of the vehicle or the antenna assembly by a planar coupling. The antenna assembly may be coupled with the vehicle by a compliant coupling that provides a centering force between the antenna assembly and the vehicle. According to various examples, rotational movement between the antenna assembly and the vehicle may be suppressed, and vibration from the vehicle to the antenna assembly may be attenuated.

23 Claims, 9 Drawing Sheets

Related U.S. Application Data continuation of application No. 15/296,930, filed on Oct. 18, 2016, now Pat. No. 10,283,837.

(60) Provisional application No. 62/245,786, filed on Oct. 23, 2015.

(51) Int. Cl.
*F16F 15/133* (2006.01)
*H01Q 1/12* (2006.01)
*H01Q 3/08* (2006.01)

(56) References Cited

U.S. PATENT DOCUMENTS

| | | | |
|---|---|---|---|
| 3,703,999 A | 11/1972 | Forys et al. | |
| 4,033,541 A | 7/1977 | Malueg | |
| 4,101,102 A | 7/1978 | Lloyd | |
| 4,318,522 A | 3/1982 | Appleberry | |
| 4,458,426 A | 7/1984 | O'Connor et al. | |
| 4,582,291 A | 4/1986 | Matthews | |
| 4,596,989 A * | 6/1986 | Smith | H01Q 1/18 343/765 |
| 4,609,083 A * | 9/1986 | Stuhler | H01Q 1/18 343/765 |
| 4,645,320 A | 2/1987 | Muelling et al. | |
| 4,696,196 A | 9/1987 | Vucevic | |
| 4,756,088 A | 7/1988 | Russell et al. | |
| 4,920,349 A | 4/1990 | Le Gall | |
| 4,951,521 A | 8/1990 | Jacobson | |
| 5,090,823 A | 2/1992 | Lindsey et al. | |
| 5,368,271 A | 11/1994 | Kiunke et al. | |
| 5,396,815 A | 3/1995 | Polites et al. | |
| 5,588,369 A | 12/1996 | Rizkalla et al. | |
| 6,021,579 A | 2/2000 | Schimmels et al. | |
| 6,285,339 B1 | 9/2001 | McGill | |
| 6,396,235 B1 | 5/2002 | Ellington et al. | |
| 6,433,736 B1 | 8/2002 | Timothy et al. | |
| 6,540,198 B2 | 4/2003 | Carter et al. | |
| 6,626,412 B1 | 9/2003 | Lindsay | |
| 6,897,821 B2 | 5/2005 | Wong et al. | |
| 7,065,888 B2 | 6/2006 | Jaklitsch et al. | |
| 7,097,140 B2 | 8/2006 | Staley et al. | |
| 7,320,389 B1 | 1/2008 | Myers et al. | |
| 7,561,784 B2 | 7/2009 | Wescott et al. | |
| 7,671,311 B2 | 3/2010 | Ellison et al. | |
| 8,091,833 B2 | 1/2012 | Von Flotow et al. | |
| 8,146,993 B2 | 4/2012 | Schneider et al. | |
| 8,494,725 B2 | 7/2013 | Zurfluh | |
| 8,542,156 B2 | 9/2013 | Patel | |
| 8,657,250 B2 | 2/2014 | Venghaus | |
| 8,672,302 B2 | 3/2014 | Borgen | |
| 8,711,223 B2 | 4/2014 | Ellison | |
| 8,789,806 B2 | 7/2014 | Taylor et al. | |
| 8,829,899 B2 | 9/2014 | Polzer et al. | |
| 8,844,896 B2 | 9/2014 | Pettersson | |
| 8,897,933 B1 | 11/2014 | Teller et al. | |
| 9,127,744 B2 | 9/2015 | Chapman | |
| 9,255,399 B2 | 2/2016 | Ruan et al. | |
| 9,450,286 B1 | 9/2016 | Guerre et al. | |
| 2005/0109912 A1 | 5/2005 | Mulder | |
| 2008/0303900 A1 | 12/2008 | Stowe et al. | |
| 2010/0032876 A1 | 2/2010 | Hiley et al. | |
| 2010/0149059 A1 * | 6/2010 | Patel | H01Q 3/08 343/765 |
| 2012/0106941 A1 | 5/2012 | Greaves et al. | |
| 2012/0316685 A1 | 12/2012 | Pettersson | |
| 2013/0092813 A1 * | 4/2013 | He | H01Q 3/08 248/512 |
| 2014/0299734 A1 * | 10/2014 | Nielsen | H01Q 1/12 248/560 |
| 2015/0159370 A1 | 6/2015 | Ruan et al. | |
| 2018/0131072 A1 * | 5/2018 | Hataya | H01Q 1/125 |

FOREIGN PATENT DOCUMENTS

| | | | | |
|---|---|---|---|---|
| JP | | 09008533 A * | 1/1997 | H01Q 3/08 |
| WO | WO 2016/046104 A1 | | 3/2016 | |

OTHER PUBLICATIONS

Sea Tel, Inc., "Scheduled Inspections Record for Sea Tel Series 09 Broadband-At-Sea Antenna with DAC-2202 Antenna Control Unit", Document No. 131118, Jun. 5, 2012.

Pagano, "Wire Rope Springs for Passive Vibration Control of a Light Steel Structure", Dipartimento di Ingegneria Industriale, E-ISSN: 2224-3429, Issue 3, vol. 8, Jul. 2013 10pgs.

* cited by examiner

APPARATUSES FOR MOUNTING AN ANTENNA ASSEMBLY

CROSS REFERENCES

The present Application for Patent is a Continuation of U.S. patent application Ser. No. 16/255,288 by Larson et al., entitled "Apparatuses For Mounting An Antenna Assembly" filed Jan. 23, 2019, which is a Continuation of U.S. patent application Ser. No. 15/296,930 by Larson, et al., entitled "Apparatuses For Mounting An Antenna Assembly" filed Oct. 18, 2016, which claims priority to U.S. Provisional Patent Application No. 62/245,786 by Larson, et al., entitled "Antenna Stabilization System," filed Oct. 23, 2015, assigned to the assignee hereof, the entirety of which is expressly incorporated herein for any and all purposes.

BACKGROUND

Antenna mounting systems may be employed when mounting an antenna assembly at a location that may experience vibration or shock loading. These locations may include various vehicles (land-based vehicles, water-borne vehicles, airborne vehicles, etc.), or ground-based locations that may experience seismic loading. Vibration and shock loading may cause damage to an antenna assembly, such as unintentional component contact, mechanical damage (e.g. yielding, rupture, etc.), fatigue damage, loosening of components, separation of electrical connections, and others. Vibration and shock loading may also result in degraded system performance, including alignment errors from transmitted vibrations or poor alignment controller feedback performance, erroneous sensor measurements, and the like. Thus, mounting systems may be designed to isolate an antenna assembly from vibrations or shock loading in order to improve performance of components sensitive to such conditions.

Isolation provided by such mounting systems may add one or more degrees of freedom between an antenna assembly and the location to which the antenna assembly is mounted. For example, compliance of a mounting assembly used to isolate the antenna assembly from vehicle vibrations may introduce one or more translational degrees of freedom and/or one or more rotational degrees of freedom between the antenna assembly and the vehicle. Although the degree(s) of freedom may attenuate transmission of certain vibrations from the vehicle to the antenna system, the degrees of freedom may also impair the antenna systems ability to track a target device, such as a satellite or another vehicle. For example, unconstrained translation and/or rotation may introduce an alignment error of antenna assembly alignment controller. Unconstrained rotation between an antenna assembly and a vehicle may be particularly detrimental, because the effect of angular pointing error may be amplified over a distance between the antenna assembly and a target device.

SUMMARY

Methods, systems, and devices are described for mounting an antenna assembly to a vehicle, whereby at least one rotational degree of freedom between the antenna assembly and the vehicle is constrained. According to aspects of the present disclosure, an antenna mount may employ an intermediate structure coupled between an antenna assembly and a vehicle. In some examples the intermediate structure may be coupled with the vehicle by a linear coupling, where the linear coupling constrains movement between the intermediate structure and the vehicle to be along a linear direction (e.g., a vertical direction with respect to the vehicle). In some examples the antenna assembly may be coupled with the intermediate structure by a planar coupling, where the planar coupling allows relative movement between the antenna assembly and the intermediate structure within a plane that is non-parallel with the linear direction (e.g., a horizontal plane with respect to the vehicle). Thus, the planar coupling may be associated with a reference plane that may move relative to the vehicle along the linear direction of the linear coupling (e.g., due to relative motion between the intermediate structure and the vehicle). Motion within the plane may include relative translation between the antenna assembly and the intermediate structure in any direction parallel to the plane, relative rotation between the antenna assembly and the intermediate structure about an axis perpendicular to the plane, or combinations of these motions.

A compliant coupling may couple the antenna assembly with the vehicle and provide a centering force between the antenna assembly and the vehicle. For example, the compliant coupling may provide a centering force that is based on relative translation between the antenna assembly and the vehicle along the linear direction, relative translation between the antenna assembly and the vehicle in any direction parallel to the plane of the planar coupling, relative rotation between the antenna assembly and the vehicle about an axis perpendicular to the plane, or combinations of these relative movements.

Antenna mounts such as the examples described in the present disclosure may suppress rotational movement of the antenna assembly about any axis in the plane (e.g., any axis parallel to the plane), thereby providing a stable platform for aligning the antenna with a target device. In examples where the plane is associated with a horizontal plane (e.g., with respect to a vehicle), the plane may provide a stable platform for controlling an elevation axis of an antenna assembly, a polarization axis of the antenna assembly, or both. By providing such a platform, alignment control of the antenna assembly may be improved over mounting systems that do not suppress rotational movement, while still attenuating the transmission of certain vibrations and/or shock loads from the vehicle to the antenna assembly.

Further scope of the applicability of the described methods and apparatuses will become apparent from the following detailed description, claims, and drawings. The detailed description and specific examples are given by way of illustration only, since various changes and modifications within the scope of the description will become apparent to those skilled in the art.

BRIEF DESCRIPTION OF THE DRAWINGS

A further understanding of the nature and advantages of various aspects of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to antenna mounting systems, particularly those that suppress rotational movement of an antenna assembly relative to a vehicle. By suppressing rotational movement between an antenna assembly and a vehicle, the antenna assembly may have favorable alignment control characteristics as compared with mounting systems that allow rotational movement between an antenna assembly and a vehicle.

As described herein, antenna mounting systems that suppress rotational movement between an antenna assembly and a vehicle may employ an intermediate structure coupled between the antenna assembly and the vehicle. The intermediate structure may be coupled with one of the vehicle or the antenna assembly by way of a linear coupling, such as one or more linear bearings, which allow relative movement along a linear direction. The intermediate structure may be coupled with the other of the vehicle or the antenna assembly by way of a planar coupling, which may include one or more contact pads, one or more spherical rolling elements, or combinations of these elements. The antenna assembly may be coupled with the vehicle by way of a compliant coupling that provides a centering force between the antenna assembly and the vehicle. For example, the compliant coupling may include one or more wire rope isolators that provides a centering force based on relative translations and/or rotations between the antenna assembly and the vehicle.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various components as appropriate. For instance, it should be appreciated that the apparatuses may be arranged in an order different than arrangements described, and that various components may be added, omitted or combined. Also, aspects and elements described with respect to certain embodiments may be combined in various other embodiments. It should also be appreciated that the following systems and devices may individually or collectively be components of a larger system.

Figure 1B:
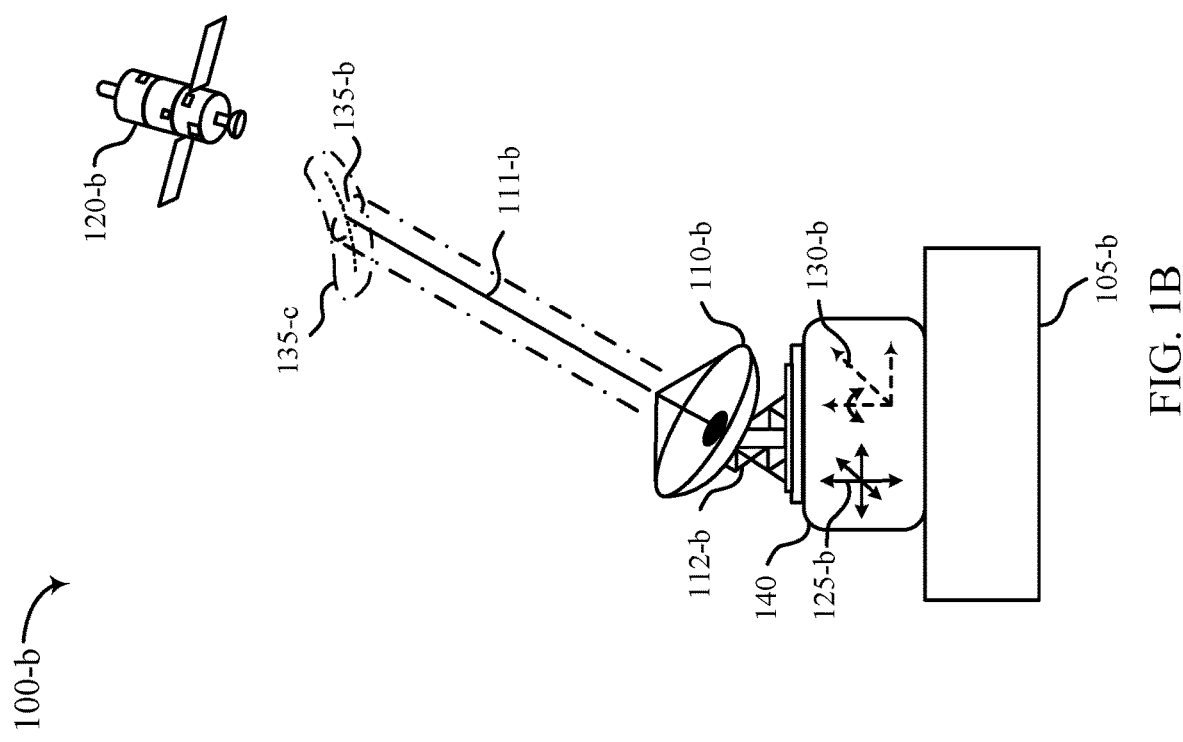
FIGS. 1A and 1B show diagrams of an antenna assembly mounted to a vehicle in accordance with aspects of the present disclosure.
Figure 1A:
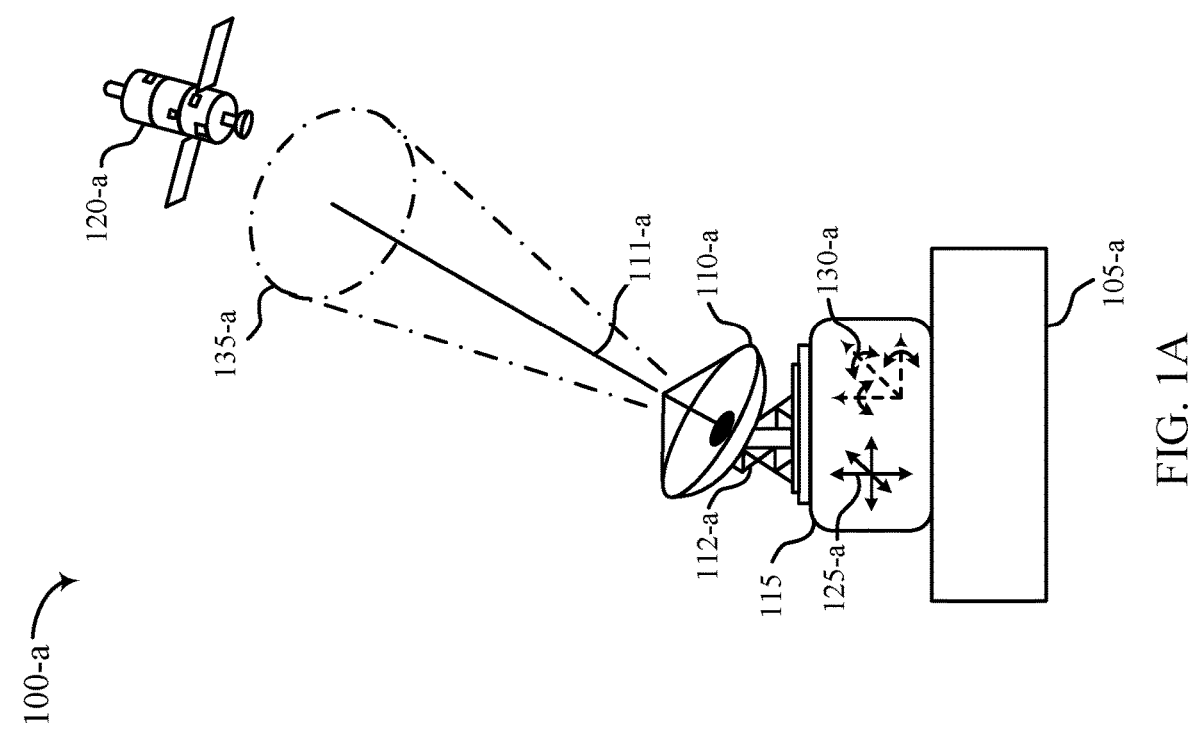

FIGS. 1A and 1B show diagrams of mobile communication systems 100 in accordance with aspects of the present disclosure. For example, mobile communication systems 100 may include antenna assemblies 110 mounted to vehicles 105 for communications with a target device 120. The antenna assemblies 110 may each be any type of antenna, including various types of reflector antenna. Antenna assemblies 110 may be associated with a boresight 111, which may represent a direction of highest signal gain for the respective antenna assembly 110. Thus, it may be desirable to have a boresight 111 pointed in a direction of a target device 120. In some examples the target device 120 can be a satellite, which may be following an orbital path (e.g., geostationary orbit, low earth orbit, medium earth orbit, etc.). Other examples of target devices 120 may include an aircraft in flight, a terrestrial target, such as another ground-based, water-borne, or airborne vehicle, or a ground-based antenna.

The antenna assemblies 110 may include an alignment control system 112 configured to direct the boresight 111 in the direction of a target device 120, such as a satellite. An alignment control system 112 may be configured to adjust the orientation of the boresight 111 about one or more spatial axes of an antenna assembly 110, providing, for instance, azimuth (e.g., horizontal) positioning of the boresight 111 and elevation (e.g., vertical) positioning of the boresight 111. In this manner, an antenna assembly 110 can take advantage of a directional antenna that has increased signal gain along the direction between the antenna assembly 110 and the target device 120. With suitable alignment of the boresight 111 with a target device 120, an antenna assembly 110 may support communication with the target device over one-way or two-way communication links.

FIG. 1A illustrates a mobile communication system 100-$a$ where an antenna assembly 110-$a$ is mounted to vehicle 105-$a$ by antenna mount 115. The antenna assembly 110-$a$ may be configured to support communications via uplink and/or downlink transmissions with the target device 120-$a$. The antenna assembly 110-$a$ may be associated with a boresight 111-$a$, which may represent a direction corresponding to a highest signal gain of the antenna assembly 110-$a$. The antenna assembly 110-$a$ may include an alignment control system 112-$a$ configured to direct the boresight 111-$a$ in the direction of a target device 120-$a$.

Antenna mount 115 may be an example of an unconstrained antenna mount that includes a compliant coupling between the antenna assembly 110-$a$ and the vehicle 105-$a$, but does not constrain translational or rotational degrees of freedom between the antenna assembly 110-$a$ and the vehicle 105-$a$. The compliant coupling of the antenna mount 115 may provide a centering force between the antenna assembly 110-$a$ and the vehicle 105-$a$, directed in opposition to translations 125-$a$ between the antenna assembly 110-$a$ and the vehicle 105-$a$ and/or rotations 130-$a$ between the antenna assembly 110-$a$ and the vehicle 105-$a$ (e.g., translations or rotations from a nominal position). In this arrangement, the antenna mount 115 may attenuate the transmission of loading and/or accelerations from the vehicle 105-$a$ to the antenna assembly 110-$a$, where such loading and/or accelerations may be due to vehicle-borne vibrations (e.g., due to engines, turbines, rotors, etc.), vehicle movements, loads and/or accelerations externally imparted on the vehicle, and the like.

The antenna mount 115 may support attenuation of such loading and accelerations by converting at least a portion of the kinetic energy of various components into potential energy stored by one or more compliant members of the antenna mount 115. In some examples a portion of the kinetic energy and/or stored potential energy may be dissipated by the compliant member(s), or another portion of the antenna mount 115, by way of dynamic friction, viscous damping, electromagnetic damping, or any other suitable means. These conversions of energy may attenuate loads and/or accelerations from the vehicle 105-a, which may reduce mechanical damage and/or fatigue of the antenna assembly 110-a as compared with a fully-constrained antenna mount which constrains both translational and rotational movement (e.g., a rigid antenna mount).

The conversion of kinetic energy into potential energy of the antenna mount 115-a may be associated with relative displacement between the antenna assembly 110-a and the vehicle 105-a. Thus, in the example of an unconstrained antenna mount 115, various accelerations of the vehicle 105-a may be translated into translations 125-a and rotations 130, which may cause the antenna boresight alignment to vary, with reference to the vehicle 105-a, across a boresight alignment range 135-a. To isolate the effect of boresight alignment range 135-a due to relative displacement between the antenna assembly 110-a and the vehicle 105-a, the arrangement of FIG. 1A is shown with reference to the vehicle 105-a, and therefore omits movements of the vehicle itself. The translations 125-a and rotations 130-a, caused by translational or vibrational inputs from the vehicle 105-a, may be based at least in part on the natural frequency of the system (e.g., based at least in part on mass, moment of inertia, stiffness, damping, etc.). Accordingly, such translations 125-a and/or rotations 130 may be particularly severe when the frequency of accelerations and/or loads from the vehicle is at or near a natural frequency of sprung mass associated with the antenna assembly 110-a (e.g., due to resonance).

As shown by the example of mobile communication system 100-a, the combination of translations 125-a and rotations 130-a may lead to a relatively broad boresight alignment range 135-a relative to the vehicle 105-a, which may impair the ability of the alignment control system 112-a to point the boresight 111-a towards the target device 120-a. Rotational movement, such as rotations 130-a, may be particularly problematic because angular errors are amplified over the distance between the antenna and a target device 120. In other words, rotations 130 between a vehicle 105 and an antenna assembly 110 may be directly translated into angular pointing errors. When such errors occur at a speed and/or frequency higher than the alignment controller can compensate for, and/or when such errors are not measured and accounted for, the boresight 111-a may depart from an alignment with the target device 120-a, and a communication link between the antenna assembly 110-a and the target device 120-a may be lost. Translations 125-a may not be associated with such conditions, because the effect of translations 125-a on boresight alignment is not amplified over the distance between the antenna assembly 110-a and the target device 120-a. Thus, rotations 130-a may result in significantly greater alignment errors between the antenna assembly 110-a and the target device 120 than translations 125-a.

FIG. 1B illustrates a mobile communication system 100-b where an antenna assembly 110-b is mounted to vehicle 105-b by an antenna mount 140. The antenna assembly 110-b may be configured to support communications via uplink and/or downlink transmissions with the target device 120-b. The antenna assembly 110-b may be associated with a boresight 111-b, which may represent a direction corresponding to a highest signal gain of the antenna assembly 110-b. The antenna assembly 110-b may also include an alignment control system 112-b configured to direct the boresight 111-b in the direction of a target, such as the target device 120-b.

Antenna mount 140 may be an example of a constrained antenna mount that constrains rotational motion along one or more axes. For example, the antenna mount 140 may include a planar coupling which suppresses rotational movement of the antenna assembly 110-b relative to the vehicle 105 along any axis parallel to a plane associated with the planar coupling. The plane may, for example, be a reference plane for an elevation angle of the antenna assembly 110-b (e.g., a reference plane for determining an elevation axis of the alignment control system 112-b), and in some examples may be parallel to a horizontal plane of the vehicle 105-b. Thus, in some examples, antenna mount 140 may suppress rotational movement of the antenna assembly 110-b about a roll axis of the vehicle 105-b, a pitch axis of the vehicle 105-b, or both of these axes.

In some examples the antenna mount 140 may permit rotations 130-b, which may be aligned about a yaw axis of the vehicle 105-b and/or an azimuth axis of the antenna assembly 110-b. Thus, in some examples the antenna assembly 110-b may experience translations 125-b relative to the vehicle 105-b in any direction, and rotations 130-b about a yaw axis. Such motions may be associated with a boresight alignment range 135-c (e.g., a circular or elliptical boresight alignment range 135-b due to translations 125-b, which is swept horizontally as a result of rotations 130-b about a yaw axis). In other examples the antenna mount 140 may not permit any rotations 130-b, or may otherwise minimize rotations 130-b about a yaw axis, and may therefore be configured to only permit translations 125-b. In such examples the boresight range may be associated with the circular or elliptical boresight alignment range 135-b due to translations 125-b.

Thus, according to various aspects of the present disclosure, an antenna mount 140 may be provided to reduce a boresight alignment range 135, thereby reducing boresight alignment errors caused by relative motions between an antenna assembly 110 and a vehicle 105. Such an antenna mount 140 may suppress rotational movement of an antenna assembly relative to a vehicle along any axis in a plane associated with a planar coupling coupled between an antenna assembly 110 and a vehicle 105, while also attenuating the transmission of certain loads and/or accelerations from the vehicle 105 to the antenna assembly 110.

Figure 2:
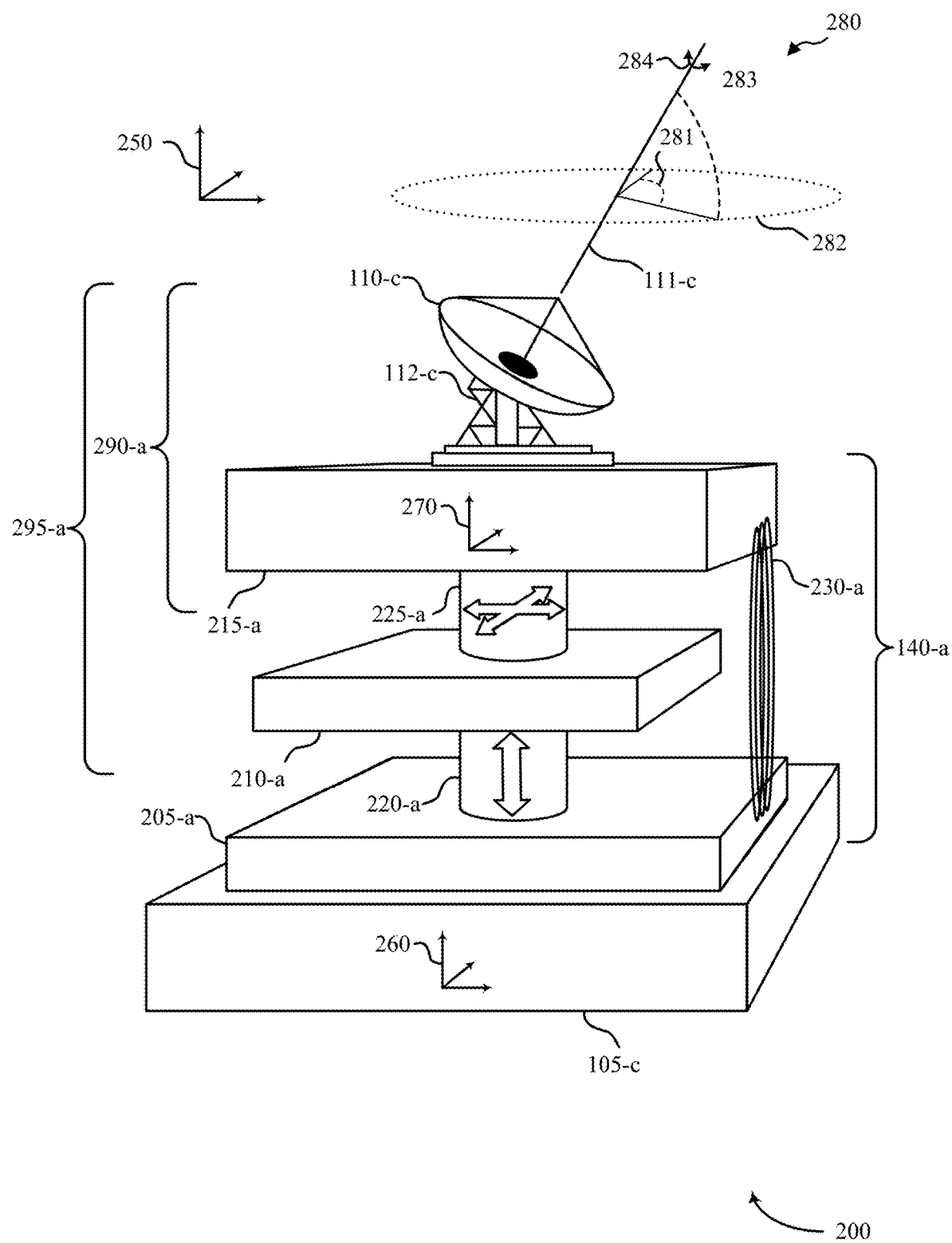
FIGS. 2 and 3 show diagrams of antenna mounts for suppressing rotational movement between an antenna assembly and a vehicle, in accordance with aspects of the present disclosure.

FIG. 2 shows a diagram of a mobile communication system 200 including a vehicle-mounted antenna assembly 110-c, in accordance with aspects of the present disclosure. The mobile communication system 200 includes an example of an antenna mount 140-a for attenuating transmission of loads and accelerations from a vehicle 105-c while also suppressing rotational movement between an antenna assembly 110-c and the vehicle 105-c. The antenna mount 140-a may include a first structure 205-a, a second structure 210-a, and a third structure 215-a. In the example of the mobile communication system 200, the first structure 205-a is mounted to, or is a portion of the vehicle 105-c, the third structure 215-a is mounted to, or is a portion of the antenna assembly 110-a, and the second structure is an intermediate structure coupled to the first structure and the second structure. The antenna assembly 110-c may also include an alignment control system 112-c, used to align the boresight 111-c with a target device 120 (not shown).

The structures described herein (e.g., a first structure 205, a second structure 210, or a third structure 215) are each rigid components that may provide interfaces for connecting neighboring components, such as the described antenna assemblies 110, vehicles 105, and couplings. In various examples, each structure may be formed by one or more components or subcomponents. The structures, or subcomponents thereof, may be formed by any suitable method(s), including any one or combination of machining, drilling, tapping, riveting, or using materials such as plate material, billet, castings, injection moldings, and the like. In some examples the described structures or subcomponents of the structures may be formed directly by additive manufacturing techniques such as 3D printing. Each structure may also provide a mounting interface for additional components of a mobile communication system such as sensors, cables, hoses, or any other supporting subcomponents for operating an antenna assembly 110.

The mobile communication system 200 may be operating relative to a global coordinate system 250, which may include principal directions as shown. In some examples, the principal directions may reflect a polar coordinate system, such as a latitude, longitude, and elevation with reference to the center of the earth, or other suitable reference surface (e.g., sea level). In various examples a mobile communication system 200 may be operating relative to any suitable coordinate system. In order to support a communication link with a target device 120, the alignment control system 112-c may perform calculations to align the boresight 111-c along a direction between the mobile communication system 200 and the target device 120. In some examples, the alignment control system 112-c may perform calculations to determine an alignment based on a position of the mobile communication system 200 in the global coordinate system 250 and a position of the target device 120 in the global coordinate system 250.

The vehicle 105-c may be associated with a vehicle coordinate system 260, which may be aligned with the vehicle itself. For example, the vehicle coordinate system 260 may be a Cartesian coordinate system with axes aligned along a fore-aft direction of the vehicle 105-c, a lateral (e.g., left/right) direction of the vehicle 105-c, and a vertical (up/down) direction of the vehicle 105-c. Rotations of the vehicle 105-c may include roll rotations about the fore-aft direction, pitch rotation about the lateral direction, and yaw rotations about the vertical direction.

The antenna assembly 110-a may be associated with an antenna assembly coordinate system 270, which may be aligned with the base of the antenna assembly 110-c (e.g., the third structure 215-a). Like the vehicle coordinate system 260, the antenna assembly coordinate system 270 may also be a Cartesian coordinate system with axes aligned along a fore-aft direction of the vehicle, a lateral (e.g., left/right) direction, and a vertical (up/down) direction. Rotations of the vehicle may be characterized by a roll rotation about the fore-aft direction, pitch rotation about the lateral direction, and yaw rotations about the vertical direction. However, under various circumstances the vehicle coordinate system 260 and the antenna assembly coordinate system 270 may be translationally offset or rotationally misaligned, such as when there is relative displacement and/or relative rotation between the first structure 205-a and third structure 215-a. In some examples the compliant coupling 230-a may provide a centering force between the first structure 205-a and the third structure 215-a that act in a manner to reduce such translational offset and/or rotational misalignment.

The antenna assembly 110-a may also have a system of boresight alignment angles 280, which may be associated with the principal angular degrees of freedom controlled by the alignment control system 112-c for aligning the boresight 111-c towards a target device. For example, the system of boresight alignment angles 280 may include an azimuth angle 281, representing an angle of alignment in a plane 282 (e.g., about an azimuth axis perpendicular to the plane). In some examples the plane 282 may be parallel to the fore-aft and lateral directions of the antenna assembly 110-c, and the azimuth angle may be measured as an angle from the forward direction of the antenna assembly coordinate system 270. In some examples, the plane 282 may be parallel to a plane associated with the planar coupling 225-a, which may also be parallel with the horizontal plane of the vehicle 105-c (e.g., a plane parallel with the fore-aft direction and the lateral direction of the vehicle). The system of boresight alignment angles 280 may also include an elevation angle 283, representing an angle of alignment measured out-of-plane from the plane 282 (e.g., as pointing towards a vertical direction). In some examples, the system of boresight alignment angles 280 may also include a polarization angle 284, representing an angle of alignment measured about the boresight 111-c, and associated with principal direction(s) of polarization of signals communicated via the antenna assembly 110-c The antenna mount 140-a may include a linear coupling 220-a between the first structure 205-a and the second structure 210-a that constrains relative movement between the first structure 205-a and the second structure 210-a to be along a linear direction. In some examples the linear direction may be aligned with the vertical direction of the vehicle 105-c, the vertical axis of the antenna assembly 110-c, and/or the azimuth axis of the alignment control system 112-c. The linear coupling 220-a may be formed by one or several components, which may be coupled with the first structure 205-a and the second structure 210-a. For example, the linear coupling 220-a may include one or more linear bearings aligned along the linear direction. Such linear bearings may include or be otherwise referred to as a rolling element (e.g., ball, cylinder, tapered roller, etc.) bearing assembly, a ball bearing sliding bearing, a crossed roller sliding bearing, a plain bearing, a compound slide, a rack slide, a journal bearing. a linear bushing, and the like. Linear bearings may include a shaft or raceway that guides the motion of, or otherwise constrains the motion of a bearing block along the linear direction, and in the example of antenna mount 140-a, a shaft or raceway may be coupled with either the first structure 205-a or the second structure 210-a. In some examples, such as linear bearings having cylindrical shafts or raceways, or linear bearings with unsuitable load-carrying capacity in torsional directions about the axis of the linear bearing, linear coupling 220-a may include two or more linear bearings in combination to prevent relative rotations between the first structure 205-a and the second structure 210-a about an axis parallel to the cylindrical shafts or raceways.

The antenna mount 140-a may also include a planar coupling 225-a between the second structure 210-a and the third structure 215-a that allows relative movement between the second structure 210-a and the third structure 215-a within a plane that is non-parallel with the linear direction. In some examples the plane may be a reference plane associated with the planar coupling 225-a, which may be parallel to a horizontal plane of the vehicle 105-c and/or a horizontal plane of the antenna assembly 110-c. The plane associated with the planar coupling 225-a may also be parallel to the plane 282 from which elevation angle is defined and/or measured for the alignment control system 112-c. In some examples the plane associated with the planar coupling 225-a may be perpendicular to the linear direction associated with the linear coupling 220-a.

The planar coupling 225-a may be formed by one or several components, which may be coupled with the second structure 210-a and the third structure 215-a. For example, the planar coupling 225-a may include one or more contact points where the second structure 210-a and third structure 215-a are in physical contact. The contact point(s) may include spherical rolling elements (e.g., transfer bearings, ball transfers, etc.) or sliding surfaces (e.g., oil-impregnated bronze, ultra-high-molecular-weight (UHMW) polymer, graphite-lubricated pads, etc.) In other examples the planar coupling 225-a may include linear bearings aligned in different directions (e.g., aligned perpendicular to each other and aligned parallel to the plane of the planar coupling 225-a), and separated from each other by an intermediate structure. In arrangements such as this, the planar coupling 225-a may provide two linear degrees of freedom (e.g., as aligned with respective linear bearings), and may suppress in-plane rotations (e.g., prevent relative rotation between the second structure 210-a and the third structure 215-a about an axis perpendicular to the plane).

In some examples the contact points of planar coupling 225-a may all be in physical contact within the same plane. In other examples the contact points may be offset at different distances from a plane of the planar coupling 225-a but may still support the relative movement between the second structure 210-a and the third structure 215-a being within the plane associated with the planar coupling 225-a. In a planar coupling 225-a that includes contact points, the contact points may be provided with a compressive preload that maintains physical contact under certain loads and/or accelerations of the mobile communication system 200. In such examples, the planar coupling 225-a may also include one or more compliant members that support the compressive preload of the contact points. For example, the planar coupling 225-a may include one or more springs coupled between the second structure 210-a and the third structure 215-a, where the spring(s) have a tensile preload that supports the compressive preload of the contact points. In some examples the planar coupling 225-a may include one or more springs coupled between the first structure 205-a and the second structure 210-a, where the spring(s) have a compressive preload that supports the compressive preload of the contact points. Thus, in some examples of an antenna mount 140-a, the planar coupling 225-a may also include one or more components coupled between the first structure 205-a and the second structure 210-a.

Thus, by combining a linear coupling 220-a and a planar coupling 225-a via the second structure 210-a, the change in relative position between the first structure 205-a and the third structure 215-a of the antenna mount 140-a may include translations (e.g., translations 125-b described with reference to FIG. 1B) between the first structure 205-a and the third structure 215-a in any direction, and in some examples may also include relative rotation translations (e.g., rotations 130-b described with reference to FIG. 1B) between the first structure 205-a and the third structure 215-a about an axis that is perpendicular to the plane associated with the planar coupling 225-a.

The antenna mount 140-a may also include a compliant coupling 230-a that couples the first structure 205-a with the third structure 215-a, and provides a centering force between the first structure 205-a and the third structure 215-a that is based at least in part on a change in relative position between the first structure 205-a and the third structure 215-a. For example, the compliant coupling 230-a may provide a force in one or more directions that opposes an offset between the vehicle coordinate system 260 and the antenna assembly coordinate system 270, and may also provide a torque about one or more axes that opposes an angular misalignment between the vehicle coordinate system 260 and the antenna assembly coordinate system 270. In combination with the linear coupling 220-a and the planar coupling 225-a, the compliant coupling 230-a may therefore be primarily directed to providing a centering force opposing translation along the linear direction of the linear coupling 220-a, a centering force opposing translations in the plane associated with the planar coupling 225-a, and in examples where in-plane rotations are not suppressed, a centering torque that opposes rotations about an axis perpendicular to the plane associated with the planar coupling 225-a. To provide the centering force, the compliant coupling 230-a may include wire rope isolators, coil springs, leaf springs, compliant blocks of a material such as rubber, or any suitable component or combination of components.

In some examples the compliant coupling 230-a may also provide a force between the first structure 205-a and the third structure 215-a that is based at least in part on relative motion between the first structure 205-a and the third structure 215-a. Such force may be provided by dynamic friction (e.g., by friction between wires of a wire rope dampers), viscous damping (e.g., by hydraulic cylinders, shock absorbers, etc.), electromagnetic damping (e.g., by permanent magnets and conductors), or other suitable means. In some examples, forces based on relative motion may be provided by means other than the compliant coupling 230-a, such as components coupled between the first structure 205-a and the second structure 210-a (e.g., separate components or components integrated with the linear coupling 220-a), or components coupled between the second structure 210-a and the third structure 215-a (e.g., separate components or components integrated with the planar coupling 225-a)

In some examples the compliant coupling 230-a may have a stiffness along the linear direction (e.g., a linear direction associated with the linear coupling 220-a) that is different from a stiffness along the planar direction (e.g., in directions parallel to the plane associated with the planar coupling 225-a). Such characteristics may be specifically designed for the system to tune desired natural frequencies of motion of the antenna assembly with respect to the vehicle, and/or to provide desired isolation characteristics for attenuating the transmission of loads or accelerations from the vehicle 105-c to the antenna assembly 110-c. For example, it may be desirable to have greater attenuation of vibrations (e.g., a lower cutoff frequency of attenuation) along a vertical direction of the vehicle. Accordingly, it may be preferable to have a relatively low stiffness along the linear direction. In some examples, roll and pitch dynamics of the vehicle 105-c may lead to relatively high transverse accelerations of the antenna assembly 110-a (e.g., accelerations parallel to the plane associated with the planar coupling 225-a), and it may be preferable to suppress the relative in-plane motions that may result between the second structure 210-a and the planar structure 215-a (e.g., limiting excursions of the planar coupling 225-a). Thus, in some examples it may be desirable to have relatively high stiffness for motions between the first structure 205-*a* and the third structure 215-*a* in directions parallel to the plane associated with the planar coupling. In other examples, various other considerations may be taken in to account when determining a desired stiffness in various directions.

In some examples the compliant coupling 230-*a* may include two or more compliant members distributed about an axis of symmetry perpendicular to the plane. For example, the compliant members may be distributed in a circular pattern, a square pattern, or a polygonal pattern about the axis of symmetry. The distance of the compliant members from the axis of symmetry may be chosen to provide a desired rotational stiffness about the axis of symmetry. For example, for a given translational stiffness in the in-plane directions of the planar coupling 225-*a*, the compliant members may be moved farther from the axis to provide higher rotational stiffness, or moved closer to the axis of symmetry to provide lower rotational stiffness. Such design freedom may be used to balance natural frequency and isolation characteristics between translational effects and rotational effects.

In some examples, a sprung mass associated with the antenna assembly 110-*c* may be located at a position coincident with the axis of symmetry. For example, it may be desirable to prevent, or otherwise minimize translational accelerations of the vehicle 105-*c* from being converted into rotations of the antenna assembly 110-*c*. More specifically, for examples where the plane associated with the planar coupling 225-*a* is parallel to the horizontal axis of the vehicle 105-*c* and perpendicular to the azimuth axis of the alignment control system 112-*c*, it may be desirable to prevent horizontal translational accelerations and/or pitch or roll accelerations of the vehicle 105-*c* from being converted into yaw accelerations of the in-plane sprung mass 290-*a* that includes the antenna assembly 110-*a*. As used herein, "in-plane sprung mass" refers to the mass having degrees of freedom in the direction of the plane associated with the planar coupling. Thus, in the example of mobile communication system 200, the in-plane sprung mass 290-*a* includes the antenna assembly 110-*c*, the third structure 215-*a*, and at least a portion of the planar coupling 225-*a* and the compliant coupling 230-*a*. In other examples, an in-plane sprung mass 290 may include an antenna assembly 110 along with a different combination of components of an antenna mount 140. In order to minimize yaw rotations of the antenna assembly 110-*c*, it may therefore be desirable to locate the center of gravity of the in-plane sprung mass 290-*a* that includes the antenna assembly 110-*c* to be coincident with the axis of symmetry of compliant members of the compliant coupling 230-*c*.

An antenna mount 140 may be configured according to various dynamic requirements, such as natural frequencies with respect to various motions. For example, an antenna assembly 110 may, in combination with an antenna mount 140, exhibit different natural frequencies with respect to translations in the linear direction associated with a linear coupling 220, translations parallel to the plane associated with a planar coupling 225, and rotations about an axis perpendicular to the plane associated with a planar coupling 225. As is known in the art, natural frequencies of components may be based at least in part on an associated mass or moment of inertia of associated components, and a stiffness coupling such components to parts of an assembly. As shown in mobile communication system 200, the associated mass for the motions of the antenna assembly 110-*c* may be different depending on the configuration of an antenna mount 140.

For example, a natural frequency of the antenna assembly 110-*c* along the linear direction associated the linear coupling 220-*a* may be based on the sprung mass having a degree of freedom in the linear direction. Thus, the natural frequency of the antenna assembly 110-*c* along the linear direction may be based at least in part on the linearly sprung mass 295-*a*, which includes the combined mass of the antenna assembly 110-*c*, the third structure 215-*a*, the planar coupling 225-*a*, the second structure 210-*a*, and at least a portion of the linear coupling 220-*a* and the compliant coupling 230-*a*. Similarly, the natural frequency of the antenna assembly 110-*c* for translations parallel to the plane associated with the planar coupling 225-*a* may be based at least in part on the in-plane sprung mass 290-*a*, which includes the combined mass of the antenna assembly 110-*c* and the third structure 215-*a*, and at least a portion of the planar coupling 225-*a* and the compliant coupling 230-*a*. Likewise, a natural frequency of the antenna assembly 110-*c* for rotations about an axis perpendicular to the plane associated with the planar coupling 225-*a* may be based at least in part on the moment of inertia of the in-plane sprung mass 290-*a*, which includes the combined moment of inertia of the antenna assembly 110-*c* and the third structure 215-*a*, and at least a portion of the planar coupling 225-*a* and the compliant coupling 230-*a*.

In some examples it may be desirable to consider interactions between natural frequencies of the mobile communication system 200 and frequency response for the alignment control system 112-*c*. For example, to reduce resonant characteristics of the system, it may be desirable to design the system to have mechanical natural frequencies that are greater than a frequency response of the alignment control system 112-*c*. In this way the mechanical system can be relatively stiff, or even negligibly compliant (e.g., essentially rigid) from the perspective of the alignment control system 112-*c*. In other words, the mechanical system may be rigid enough that the effect of relative motions between the first structure 205-*a* and the third structure 215-*a* may be ignored for the purposes of boresight alignment control. This may have a particular advantage for measuring boresight alignment by the antenna assembly 110-*c*, since no additional sensing would be required between the antenna assembly 110-*c* and the vehicle 105-*c*.

For the antenna mount 140-*a* to be suitably stiff for azimuth control, for example, it may be desirable for the antenna mount 140-*a* to be designed with a natural frequency of rotations between the antenna assembly 110-*c* and the vehicle 105-*c* about an axis perpendicular to the plane associated with the planar coupling 225-*a* to be at least a multiple of two greater than a cutoff frequency of azimuth controller of the alignment control system 112-*c*. In other examples, different multiples may be used between the natural frequencies and associated controller cutoff frequencies, which may be based at least in part on a tolerable amount of error in the alignment of boresight 111-*c* with a target device 120 (not shown). In other examples, natural frequencies may not be a predominant design factor. For example, in some implementations it may be desirable to increase the sprung mass associated with an antenna assembly 110 so that actuation of alignment control system 112-*c* causes a lesser degree of acceleration of the sprung mass (e.g., by way of mass damping). Thus, various considerations of mass, stiffness, natural frequency, and controller response frequency may be used to design a mobile communication system 200 according to desired characteristics.

Figure 3:
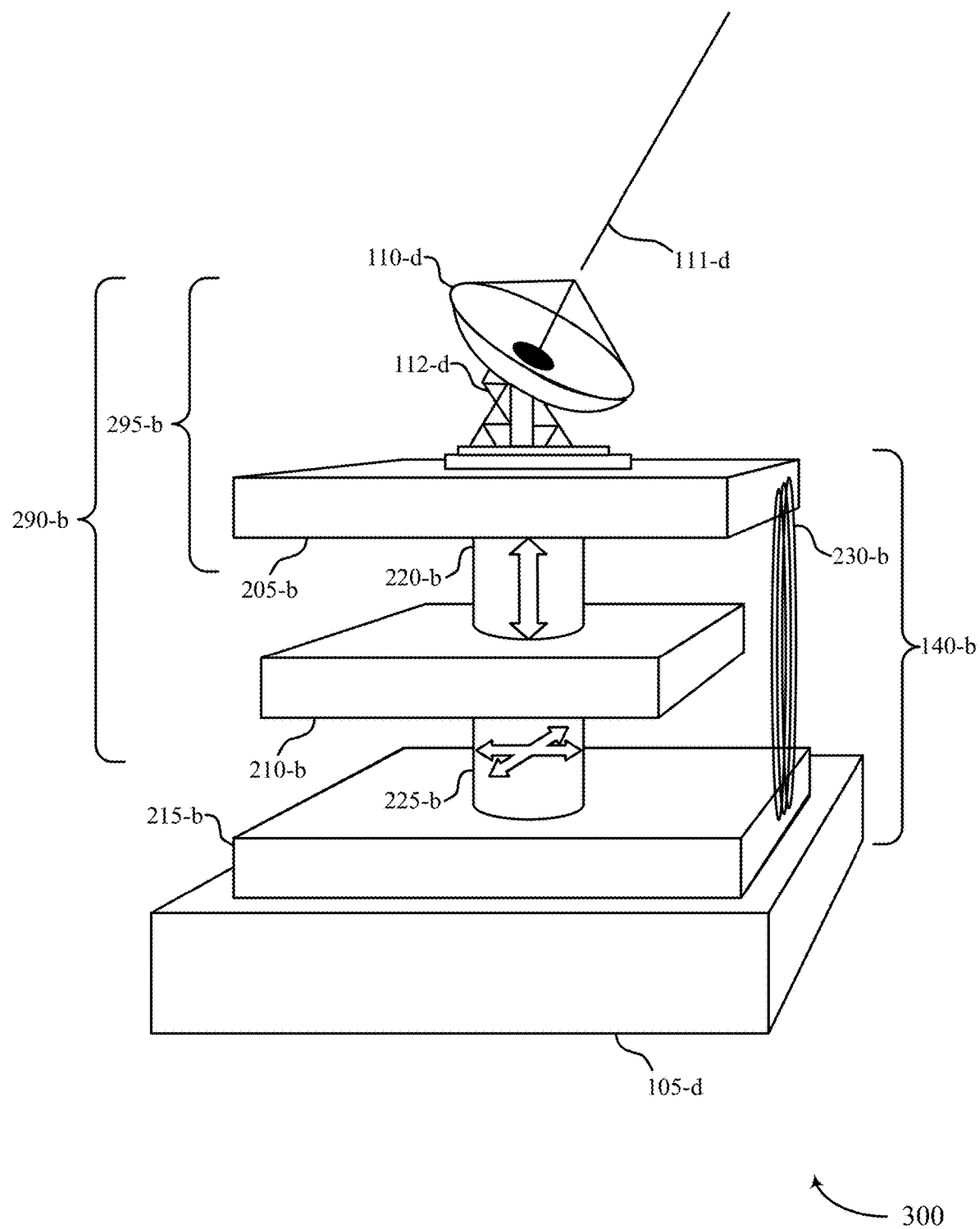

FIG. 3 shows a diagram of a mobile communication system 300 including a vehicle-mounted antenna assembly 110-d, in accordance with aspects of the present disclosure. The mobile communication system 300 includes an example of an antenna mount 140-b for attenuating transmission of loads and accelerations from a vehicle 105-d while also suppressing rotational movement between an antenna assembly 110-d and the vehicle 105-d. The antenna mount 140-b may include a first structure 205-b, a second structure 210-b, and a third structure 215-b, which may be examples one or more aspects of the corresponding components described with reference to FIG. 2. The antenna assembly 110-d may also include an alignment control system 112-d, used to align the boresight 111-d with a target device 120 (not shown).

In contrast with mobile communication system 200, the third structure 215-b is mounted to, or is a portion of the vehicle 105-d, and the first structure 205-b is mounted to, or is a portion of the antenna assembly 110-d in mobile communication system 300. Accordingly, mobile communication system 300 may include a planar coupling 225-b coupled between the vehicle 105-d and an intermediate structure (e.g., second structure 210-b) and a linear coupling 220-b coupled between the antenna assembly 110-d and an intermediate structure (e.g., second structure 210-b). However, similarly to the mobile communication system 200, mobile communication system 300 includes a compliant coupling 230-b coupled between the first structure 205-b and the third structure 215-b. Each of the planar coupling 225-b, the linear coupling 220-b, and the compliant coupling 230-b may be examples one or more aspects of the respective components described with reference to FIG. 2. Thus, the antenna mount 140-b may represent an alternate configuration for suppressing rotational movement of the antenna assembly 110-d relative to the vehicle 105-d.

In some examples, a sprung mass associated with the antenna assembly 110-d may be coincident with an axis of symmetry associated with compliant members of the compliant coupling 230-b. In the example of mobile communication system 300, the in-plane sprung mass 290-b may include the antenna assembly 110-d, the first structure 205-b, the linear coupling 220-b, the second structure 210-b, and at least a portion of the planar coupling 225-b and the compliant coupling 230-b. In order to minimize yaw rotations of the antenna assembly 110-d, it may therefore be desirable to locate the center of gravity of the in-plane sprung mass 290-b that includes the antenna assembly 110-d to be coincident with the axis of symmetry of compliant members of the compliant coupling 230-d.

In some examples the antenna mount 140-b may be configured according to different dynamic requirements than antenna mount 140-a described with reference to FIG. 2. For example, a natural frequency of the antenna assembly 110-d along the linear direction associated the linear coupling 220-b may be based on the sprung mass having a degree of freedom in the linear direction. Thus, the natural frequency of the antenna assembly 110-d along the linear direction may be based at least in part on the linearly sprung mass 295-b, which includes the combined mass of the antenna assembly 110-d, the third structure 215-b and at least a portion of the planar coupling 225-b and the compliant coupling 230-b. Similarly, the natural frequency of the antenna assembly 110-d for translations parallel to the plane associated with the planar coupling 225-b may be based at least in part on the in-plane sprung mass 290-b, which includes the combined mass of the antenna assembly 110-d, the third structure 215-b, the linear coupling 220-b, the second structure 210-b, and at least a portion of the planar coupling 225-b and the compliant coupling 230-b. Likewise, a natural frequency of the antenna assembly 110-d for rotations about an axis perpendicular to the plane associated with the planar coupling 225-b may be based at least in part on the moment of inertia of the in-plane sprung mass 290-b, which includes the combined moment of inertia of the antenna assembly 110-d, the third structure 215-a, the linear coupling 220-b, the second structure 210-b, and at least a portion of the planar coupling 225-b and the compliant coupling 230-b.

Thus, as compared to the antenna assembly 110-c described with reference to FIG. 2, for components having the same inertial properties and compliant couplings 230 having the same stiffness, the antenna assembly 110-d may be characterized as having a higher natural frequency for motions in the linear direction associated with the linear coupling 220-b, and lower natural frequency for translations parallel to, and rotations about an axis perpendicular to the plane associated with the planar coupling 225-b (e.g., lower in-plane natural frequency).

Figure 4A:
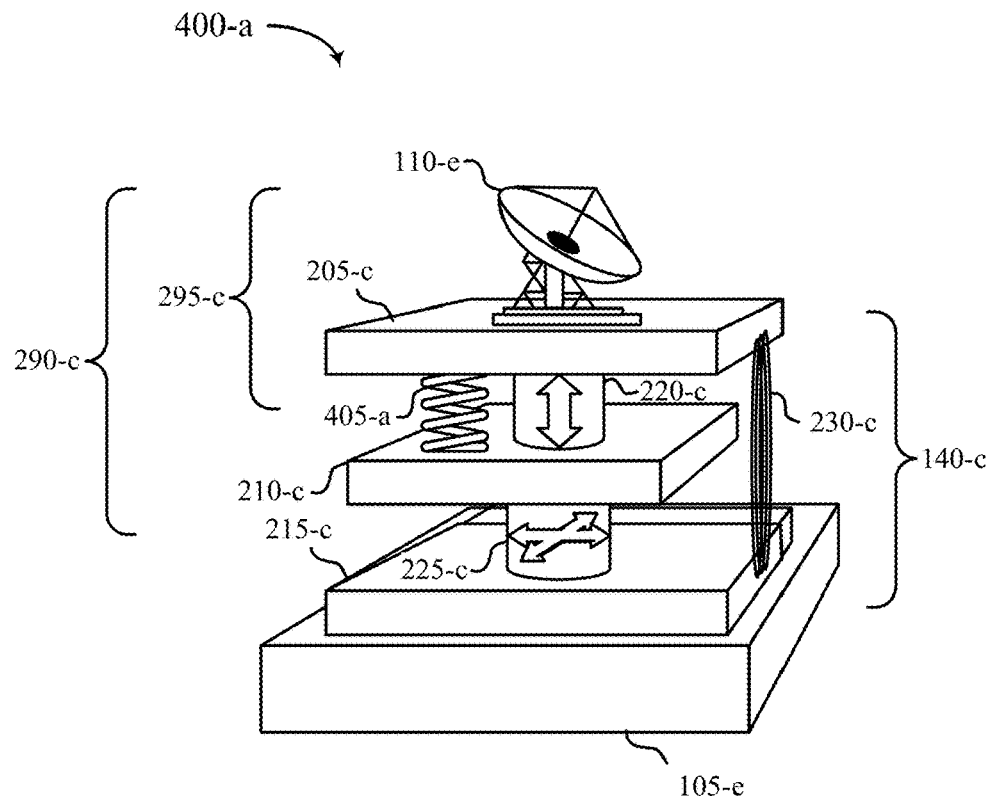
FIGS. 4A and 4B show different arrangements of antenna mounts for suppressing rotational movement between an antenna assembly and a vehicle, in accordance with aspects of the present disclosure.
Figure 4B:
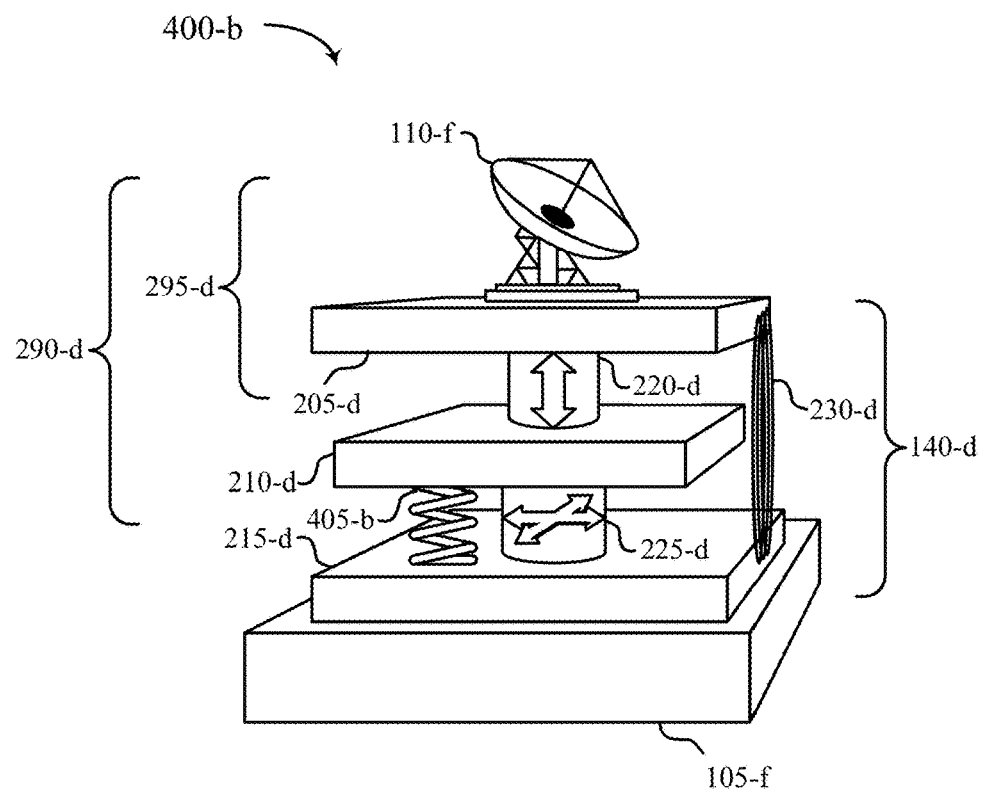

FIGS. 4A and 4B show diagrams of mobile communication systems 400-a and 400-b including different arrangements of antenna mounts 140 for suppressing rotational movement between an antenna assembly 110 and a vehicle 105, in accordance with aspects of the present disclosure. Antenna mounts 140 may include a first structure 205, a second structure 210, a third structure 215, a linear coupling 220, a planar coupling 225, and a compliant coupling 230, each of which may be examples of one or more aspects of the respective components described with reference to FIGS. 2-3. As previously described, contacting elements of a planar coupling 225-c may have a compressive preload to maintain contact through various system movements or vibrations. The arrangements of mobile communication systems 400-a and 400-b show examples of different configurations for providing such a compressive preload in a planar coupling 225.

FIG. 4A illustrates an antenna mount 140-c that includes a compliant member 405-a coupled between a first structure 205-c and a second structure 210-c, where the compliant member 405-a supports a compressive preload of contact points of the planar coupling 225-c. The compliant member 405-a may be a spring or a compliant block, and in the example of antenna mount 140-c, the compliant member 405-a may be under a compressive preload. The compressive preload of the compliant member 405-a may be reacted by the compliant coupling 230-c, where the compliant coupling 230-c may be under a tensile preload, or may have a compressive preload (e.g., due to supporting the mass of the antenna assembly 110-e and components of the antenna mount 140-c against gravity) reduced. Antenna mount 140-c illustrates an example where a compliant member 405 is coupled between different components than a planar coupling 225, while still supporting a compressive preload of the planar coupling 225. In the example of antenna mount 140-c, the compliant member 405-a may be included in both an in-plane sprung mass 290-c and a linearly sprung mass 295-c. Although only one compliant member 405-a is illustrated, various examples may include more than one compliant member 405-a.

FIG. 4B illustrates an antenna mount 140-d that includes a compliant member 405-b coupled between a second structure 210-d and a third structure 215-d, where the compliant member 405-b supports a compressive preload of contact points of the planar coupling 225-d. The compliant member 405-*b* may be a spring or a compliant block, and in the example of antenna mount 140-*d*, the compliant member 405-*b* may be under a tensile preload. The tensile preload of the compliant member 405-*b* may be entirely reacted by the contact points of the planar coupling 225-*d*. Antenna mount 140-*d* illustrates an example where a compliant member 405 is coupled between the same components as a planar coupling 225. Although the compliant member 405-*b* is shown as a separate component from the planar coupling 225-*d*, in some examples the compliant coupling 405-*b* and the planar coupling 225-*d* may be integrated in the same component. In the example of antenna mount 140-*d*, at least a portion of the compliant member 405-*b* may be included the in-plane sprung mass 290-*d*, but the compliant member 405-*b* may be excluded from the linearly sprung mass 295-*d*. Although only one compliant member 405-*b* is illustrated, various examples may include more than one compliant member 405-*b*, or may be combined with a compliant member 405-*a* coupled between the first structure 205-*d* and the second structure 210-*d*. Although only the configurations of antenna mounts 140-*c* and 140-*d* are illustrated for the sake of brevity, compliant members 405 may be arranged in other configurations for providing the described compressive preload of a planar coupling 225. Furthermore, in some examples compliant members 405 may be designed such that such that a compressive preload is relieved under some circumstances (e.g., extreme vibrations, extreme shock loading, etc.) such that contact points of a planar coupling 225 would temporarily lose contact (e.g., permitting a temporary relative displacement between a second structure 210 and a third structure 215 in a direction non-parallel with a plane associated with the planar coupling 225).

FIGS. 5A-5D show diagrams of mobile communication systems 500-*a* through 500-*d* including different arrangements of antenna mounts 140 for suppressing rotational movement between an antenna assembly 110 and a vehicle 105, in accordance with aspects of the present disclosure. Antenna mounts 140 may include a first structure 205, a second structure 210, a third structure 215, a linear coupling 220, a planar coupling 225, and a compliant coupling 230, each of which may be examples of one or more aspects of the respective components described with reference to FIGS. 2-4B. The arrangements of mobile communication systems 500-*a* through 500-*d* show examples of antenna mounts 140 where a second structure 210 is mechanically coupled between a first structure 205 and a third structure 215, but is not spatially located between the first structure 205 and the third structure 215.

Figure 5A:
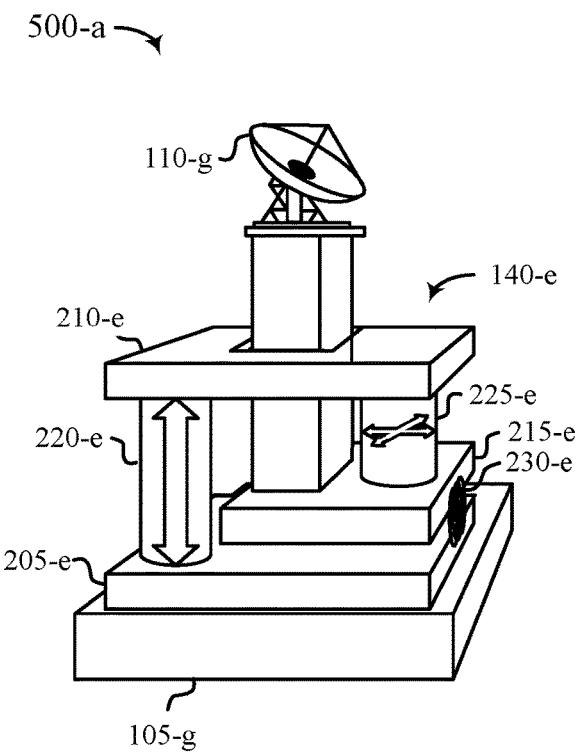
FIGS. 5A-5D show different arrangements of antenna mounts for suppressing rotational movement between an antenna assembly and a vehicle, in accordance with aspects of the present disclosure.

FIG. 5A illustrates an example of an antenna mount 140-*e*, where the first structure 205-*e* is coupled with the vehicle 105-*g*, and the third structure 215-*e* is coupled with the antenna assembly 110-*g*. As shown, the antenna mount 140-*e* may include a linear coupling 220-*e* between the first structure 205-*e* and the second structure 210-*e*, a planar coupling 225-*e* between the second structure 210-*e* and the third structure 215-*e*, and a compliant coupling 230-*e* between the first structure 205-*e* and the third structure 215-*e*. For antenna mount 140-*e*, the second structure 210-*e* is arranged over both the first structure 205-*e* and the third structure 215-*e* such that the third structure 215-*e* and/or antenna assembly 110-*g* passes through or around the second structure 210-*e*. For example, as shown, the second structure 210-*e* may include a cutout where the third structure 215-*e* passes through the second structure 210-*e*. Additionally or alternatively, the third structure 215-*e* and/or antenna assembly 110-*g* may pass around the second structure 210-*e* (e.g., without a hole or cutout in the second structure 210-*e*).

Figure 5B:
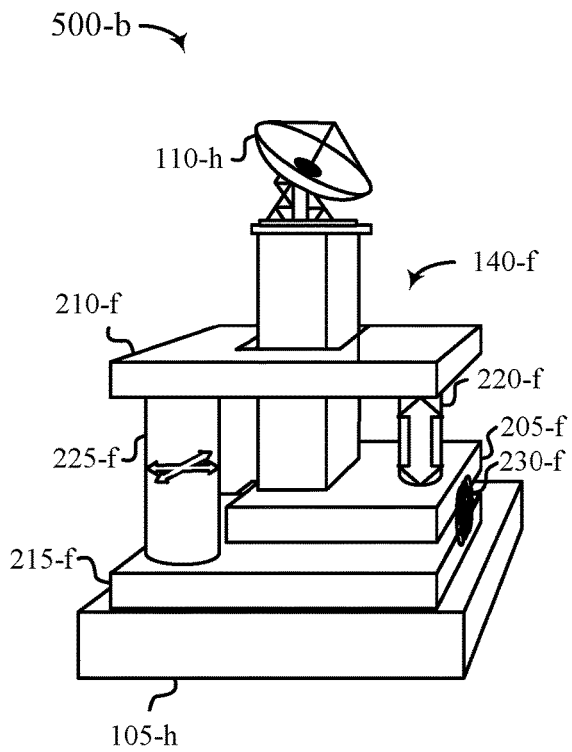

FIG. 5B illustrates an example of an antenna mount 140-*f*, where the first structure 205-*f* is coupled with the antenna assembly 110-*h*, and the third structure 215-*f* is coupled with the vehicle 105-*h*. As shown, the antenna mount 140-*f* may include a linear coupling 220-*f* between the first structure 205-*f* and the second structure 210-*f*, a planar coupling 225-*f* between the second structure 210-*f* and the third structure 215-*f*, and a compliant coupling 230-*f* between the first structure 205-*f* and the third structure 215-*f*. For antenna mount 140-*f*, the second structure 210-*f* is arranged over both the first structure 205-*f* and the third structure 215-*f* such that the first structure 205-*f* and/or the antenna assembly 110-*h* passes through or around the second structure 210-*f*. For example, as shown, the second structure 210-*f* may include a cutout where the first structure 205-*f* passes through the second structure 210-*f*. Additionally or alternatively, the first structure 205-*f* and/or antenna assembly 110-*h* may pass around the second structure 210-*f* (e.g., without a hole or cutout in the second structure 210-*f*).

Figure 5C:
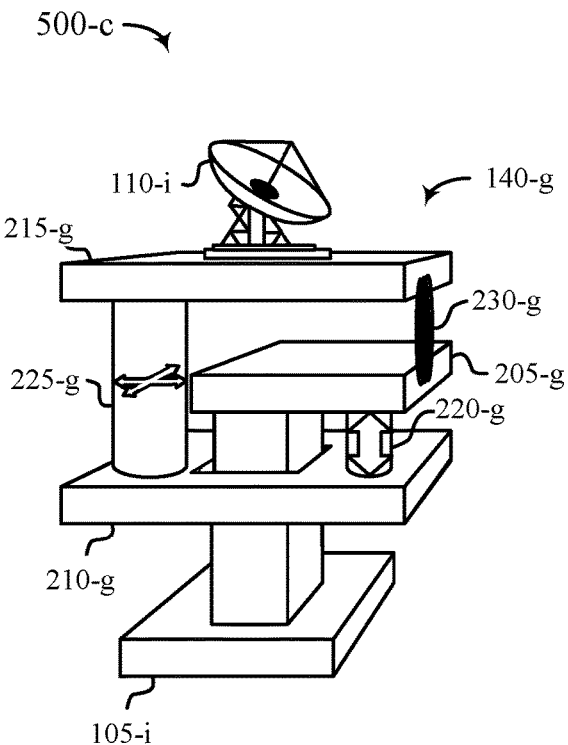

FIG. 5C illustrates an example of an antenna mount 140-*g*, where the first structure 205-*g* is coupled with the vehicle 105-*i*, and the third structure 215-*g* is coupled with the antenna assembly 110-*i*. As shown, the antenna mount 140-*g* may include a linear coupling 220-*g* between the first structure 205-*g* and the second structure 210-*g*, a planar coupling 225-*g* between the second structure 210-*g* and the third structure 215-*g*, and a compliant coupling 230-*g* between the first structure 205-*g* and the third structure 215-*g*. For antenna mount 140-*g*, the second structure 210-*g* is arranged below both the first structure 205-*g* and the third structure 215-*g* such that the first structure 205-*g* and/or the vehicle 105-*i* passes through or around the second structure 210-*g*. For example, as shown, the second structure 210-*g* may include a cutout where the first structure 205-*g* passes through the second structure 210-*g*. Additionally or alternatively, the first structure 205-*g* and/or vehicle 105-*i* may pass around the second structure 210-*g* (e.g., without a hole or cutout in the second structure 210-*g*).

Figure 5D:
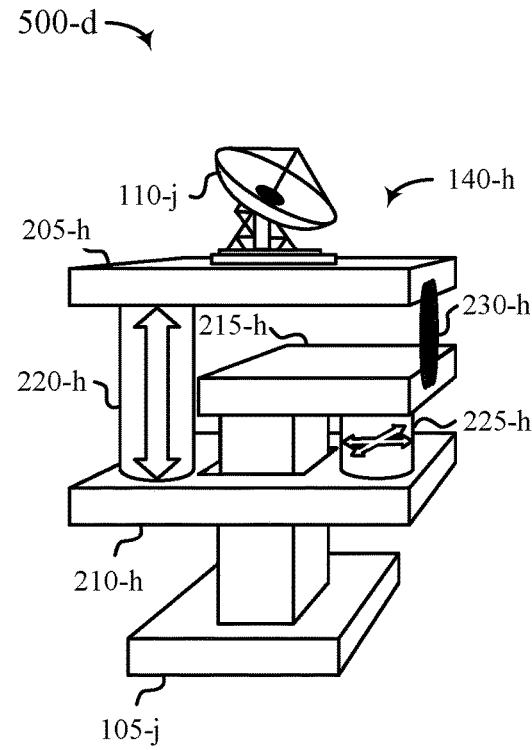

FIG. 5D illustrates an example of an antenna mount 140-*h*, where the first structure 205-*h* is coupled with the antenna assembly 110-*j*, and the third structure 215-*h* is coupled with the vehicle 105-*j*. As shown, the antenna mount 140-*h* may include a linear coupling 220-*h* between the first structure 205-*h* and the second structure 210-*h*, a planar coupling 225-*h* between the second structure 210-*h* and the third structure 215-*h*, and a compliant coupling 230-*h* between the first structure 205-*h* and the third structure 215-*h*. For antenna mount 140-*h*, the second structure 210-*h* is arranged below both the first structure 205-*h* and the third structure 215-*h* such that the third structure 215-*h* and/or the vehicle 105-*j* passes through or around the second structure 210-*h*. For example, as shown, the second structure 210-*h* may include a cutout where the third structure 215-*h* passes through the second structure 210-*h*. Additionally or alternatively, the third structure 215-*h* and/or vehicle 105-*j* may pass around the second structure 210-*h* (e.g., without a hole or cutout in the second structure 210-*h*).

Figure 6A:
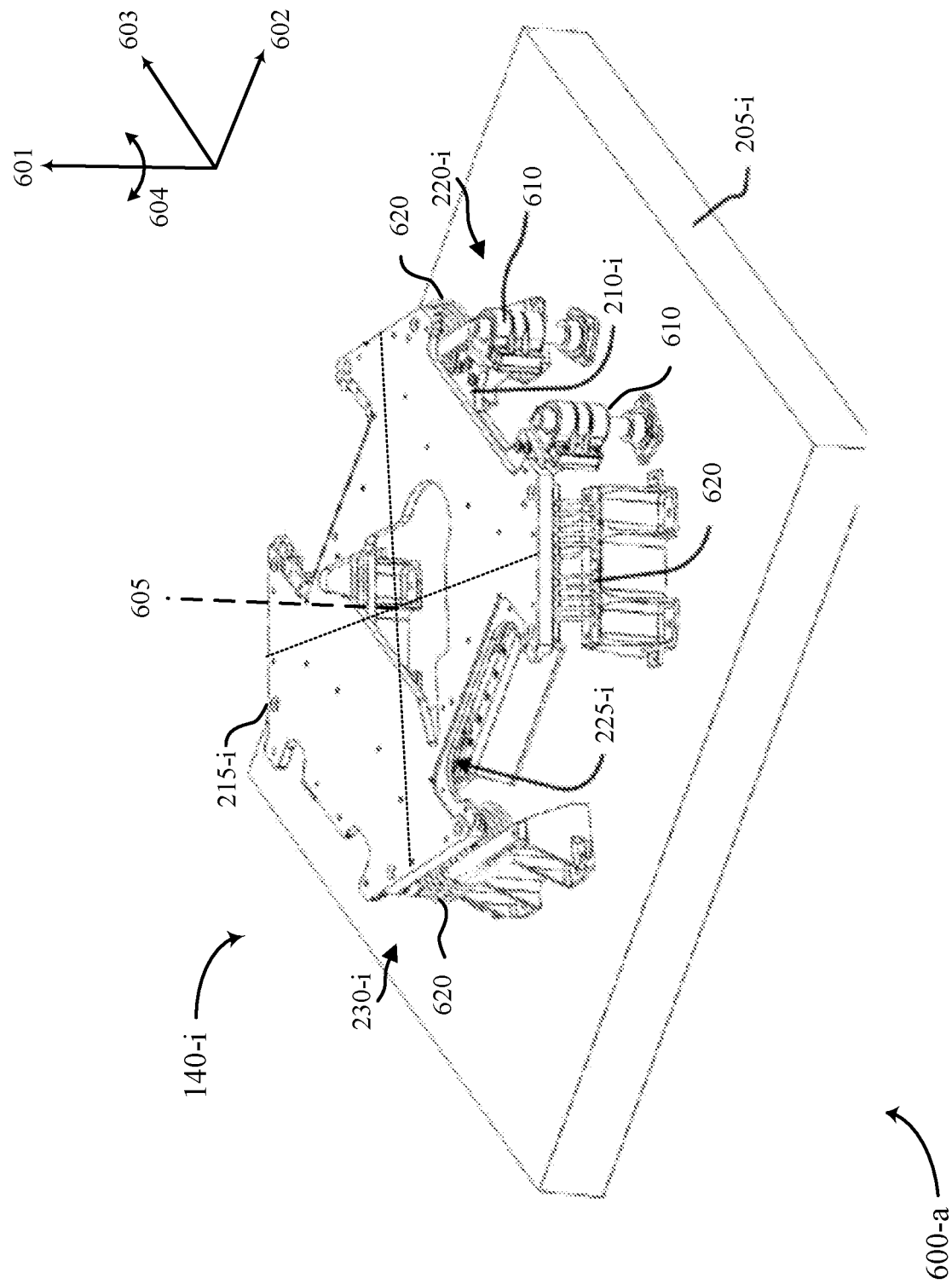
FIGS. 6A-6C show a perspective view, top-down view, and side view of an example of an antenna mount that suppresses rotational movement between an antenna assembly and a vehicle, in accordance with aspects of the present disclosure.
Figure 6B:
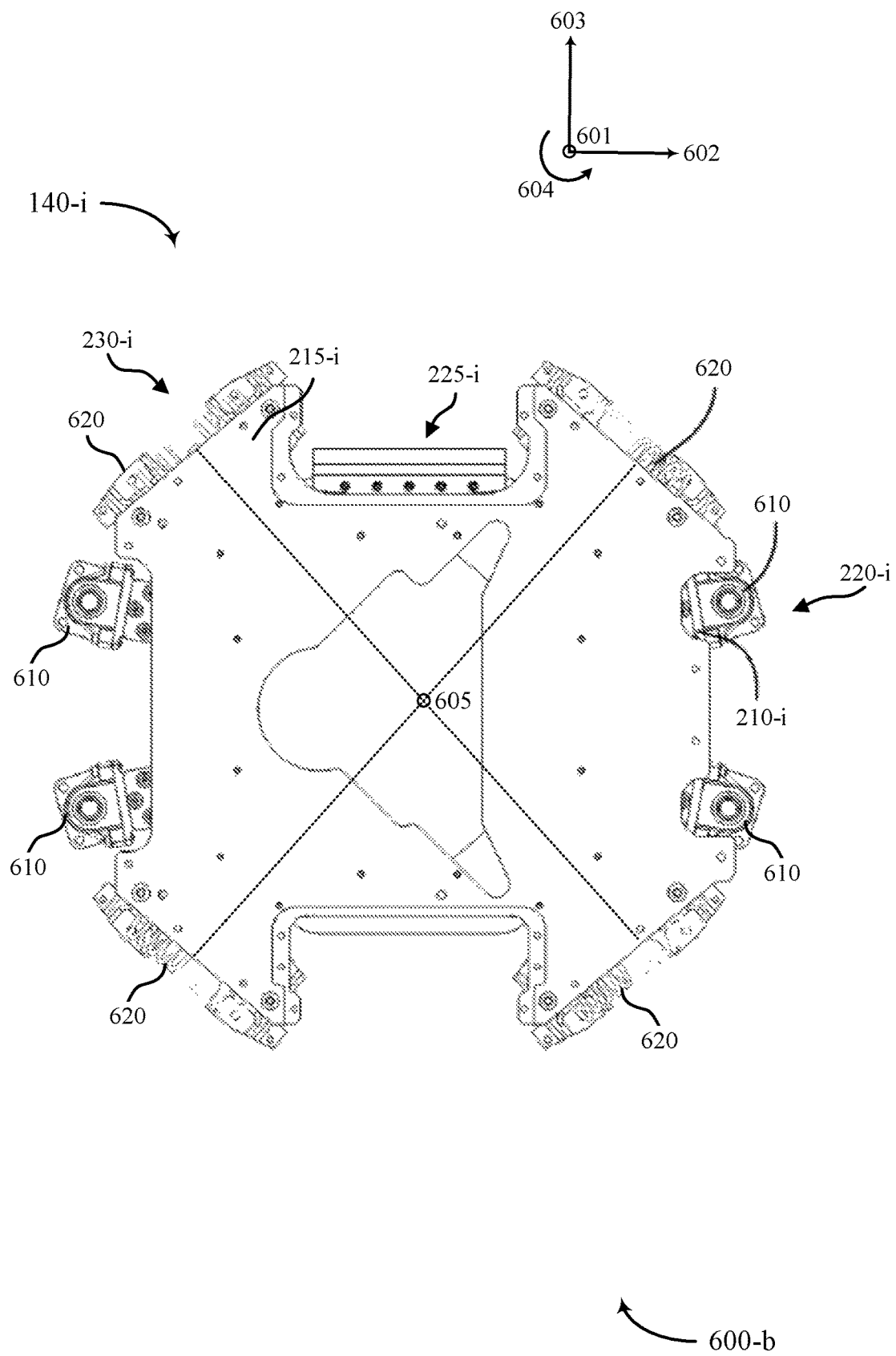
Figure 6C:
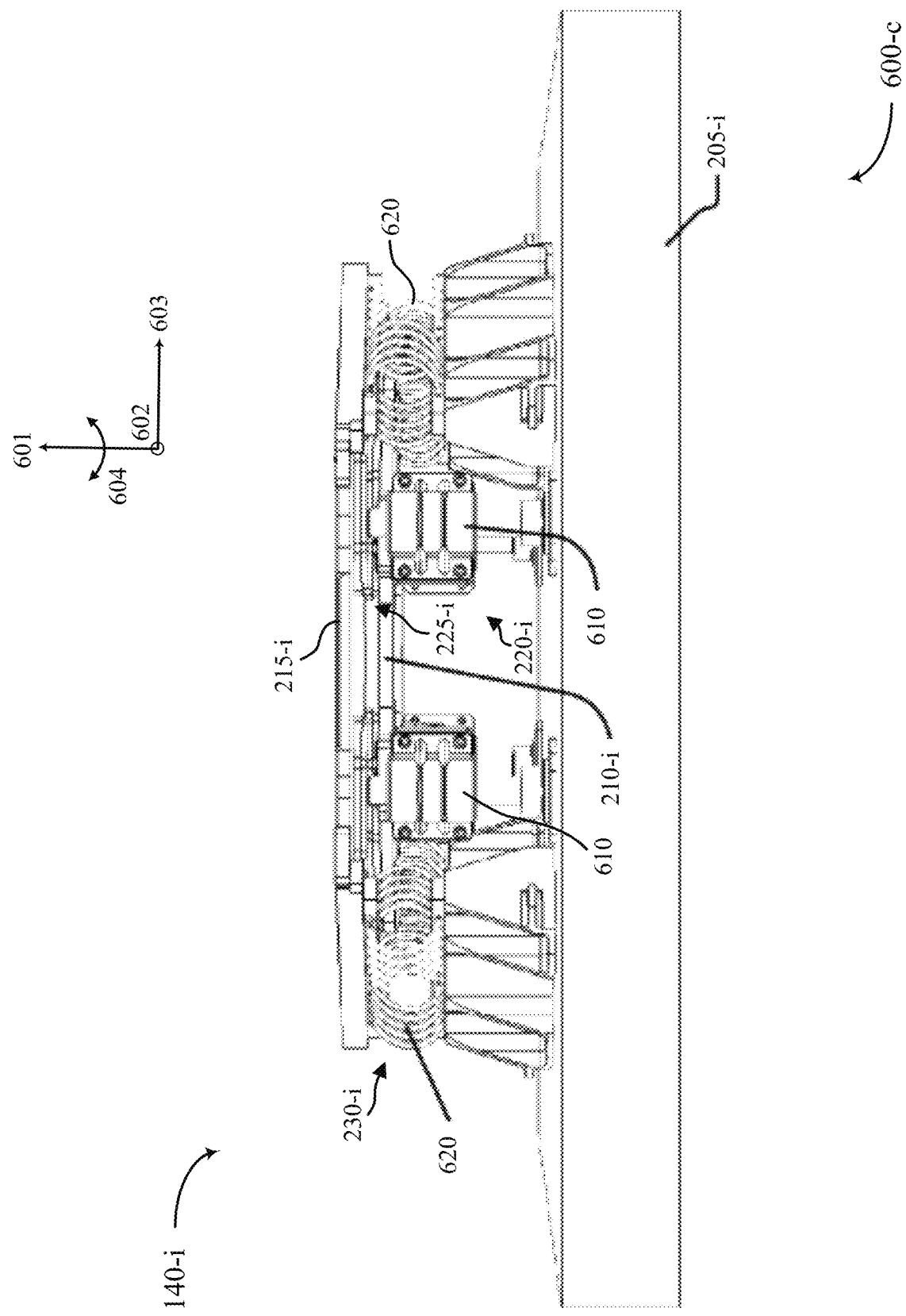

FIGS. 6A-6C illustrate an example of an antenna mount 140-*i* for suppressing rotational movement between an antenna assembly 110 and a vehicle 105, in accordance with various aspects of the present disclosure. FIG. 6A illustrates a perspective view of the antenna mount 140-*i*, FIG. 6B illustrates a top-down view of the antenna mount 140-*i*, and FIG. 6C illustrates a side view of the antenna mount 140-*i*. The antenna mount 140-*i* may include a first structure 205-*i*, a second structure 210-*i*, and a third structure 215-*i*, each of which may be examples of one or more aspects of the respective components described with reference to FIGS. 2-5D. The antenna mount 140-*i* may follow the arrangement of the antenna mount 140-*a* described with reference to FIG. 2. In other words, the first structure 205-*i* may be coupled with, or be a portion of a vehicle 105, and the third structure 215-*i* may be coupled with, or be a portion of an antenna assembly 110 (not shown). The second structure 210-*i* is an intermediate structure coupled between the first structure 205-*i* and the third structure 215-*i*.

Antenna mount 140-*i* includes an example of a linear coupling 220-*i* comprising four linear bearings 610 aligned along a linear direction (e.g., direction 601), which may be aligned with a vertical direction of a vehicle 105 and/or aligned perpendicular to an elevation reference plane 282 of an antenna assembly 110. The four linear bearings 610 of the linear coupling 220-*i* are arranged such that they constrain relative movement between the first structure 205-*i* and the second structure 210-*i* to be along the direction 601. Here, each of the linear bearings 610 are shown with pillow block bearing assemblies coupled to the second structure 210-*i* and cylindrical shafts coupled to the first structure 205-*i*, and disposed through a corresponding pillow block bearing.

Antenna mount 140-*i* also includes an example of a planar coupling 225-*i* that suppresses rotational movement of the third structure 215-*i* relative to the second structure 210-*i* about axes parallel to a plane associated with the planar coupling 225-*i*. For example, the plane associated with the planar coupling may be parallel to directions 602 and 603, and thus may suppress rotations about axes within a plane defined by direction 602 and direction 603. The planar coupling 225-*i* may permit relative translations between the second structure 210-*i* and the third structure 215-*i* within a plane defined by directions 602 and 603, and in some examples may also permit relative rotations between the second structure 210-*i* and the third structure 215-*i* about an axis that is perpendicular to directions 602 and 603 (e.g., in direction 604). In some examples directions 602 and/or 603 may be aligned with a roll axis of a vehicle 105 or a pitch axis of a vehicle 105, and may be perpendicular to direction 601. Thus, in some examples the planar coupling 225-*i* may permit relative rotations between the second structure 210-*i* and the third structure 215-*i* about the direction 601.

Antenna mount 140-*i* also includes an example of a compliant coupling 230-*i* comprising four wire rope isolators 620 that provide a centering force between the first structure 205-*i* and the third structure 215-*i*. The wire rope isolators 620 may be symmetrically arranged about axis 605, which may represent a center of stiffness with respect to the plane associated with the planar coupling 210-*i*. In some examples, an in-plane sprung mass 290 including an antenna assembly 110 mounted to the antenna mount 140-*i* may have a center of gravity located at a point coincident with the axis 605. In this way, translational loads and/or accelerations from a vehicle 105 may not be converted into rotations about an axis perpendicular to the plane associated with the planar coupling 210-*i* (e.g., rotations in direction 604).

Figure 7:
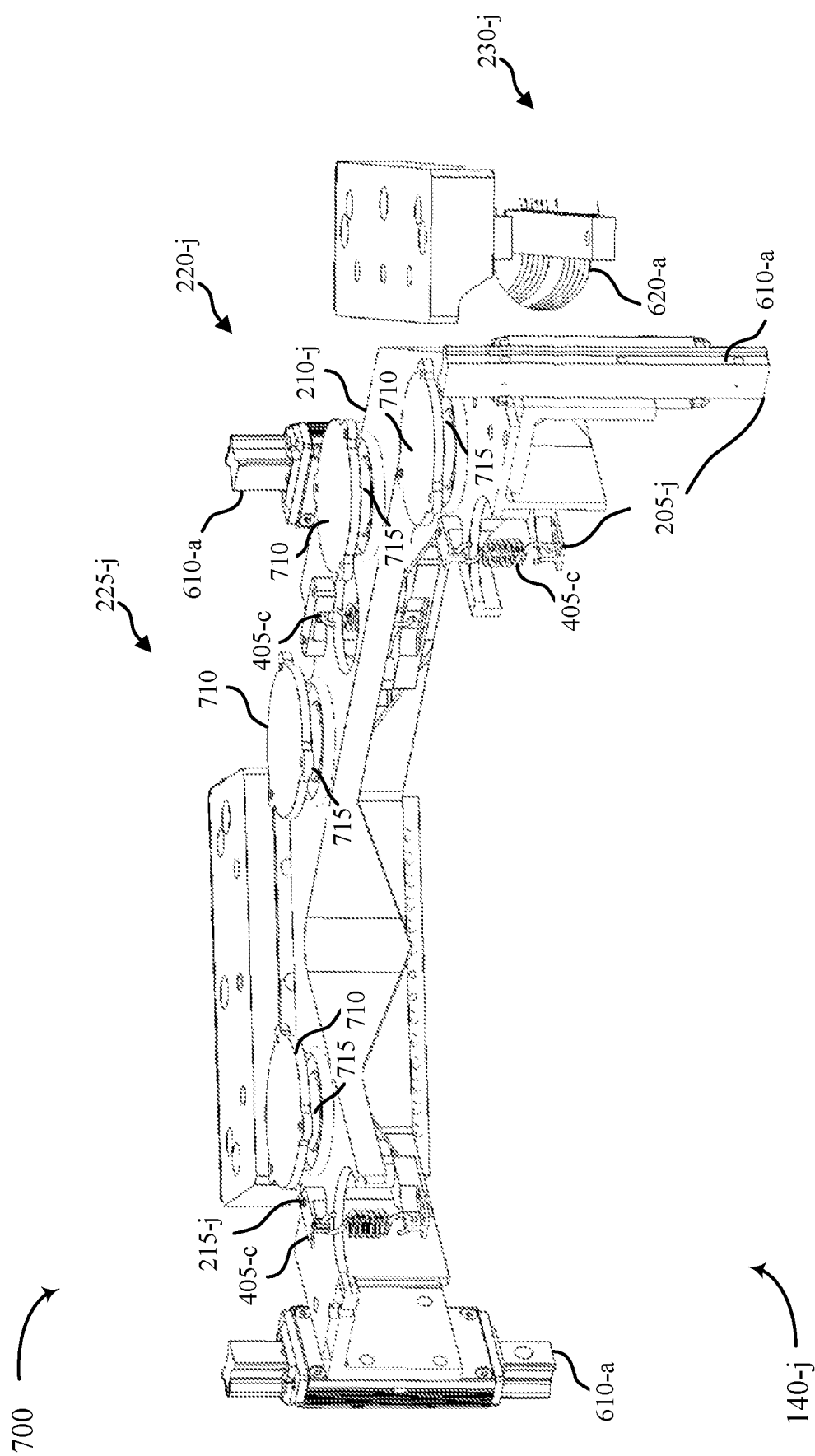
FIG. 7 shows a section view of an antenna mount that suppresses rotational movement between an antenna assembly and a vehicle, in accordance with aspects of the present disclosure.

FIG. 7 illustrates a sectional view 700 showing portions of an antenna mount 140-*j* for suppressing rotational movement between an antenna assembly 110 and a vehicle 105, in accordance with aspects of the present disclosure. The antenna mount 140-*j* may include a first structure 205-*j*, a second structure 210-*j*, and a third structure 215-*j*, each of which may be examples of one or more aspects of the respective components described with reference to FIGS. 2-6C. The antenna mount 140-*j* may follow the arrangement of the antenna mount 140-*a* described with reference to FIG. 2. In other words, the first structure 205-*j* may be coupled with, or be a portion of a vehicle 105, and the third structure 215-*j* may be coupled with, or be a portion of an antenna assembly 110. The second structure 210-*j* is an intermediate structure coupled between the first structure 205-*i* and the third structure 215-*i*. In section view 700, portions of the third structure 215-*j* are hidden so that internal components can be shown. For example, section view 700 shows aspects of a planar coupling 225-*j*, having contact plates 710 and compliant members 405-*c*.

Antenna mount 140-*i* includes an example of a linear coupling 220-*j* comprising a number of linear bearings 610-*a* aligned along a linear direction, which may be aligned with a vertical direction of a vehicle 105 and/or aligned perpendicular to an elevation reference plane 282 of an antenna assembly 110. Here, each of the linear bearings 610-*a* are shown with track bearing assemblies coupled to the second structure 210-*j* and non-cylindrical linear tracks coupled to the first structure 205-*j* and disposed through a corresponding track bearing assembly. Antenna mount 140-*j* also includes an example of a compliant coupling 230-*j* comprising a number of wire rope isolators 620-*a* that provide a centering force between the first structure 205-*j* and the third structure 215-*j*.

Planar coupling 225-*j* may be configured to suppress rotational movement of the third structure 215-*j* relative to the second structure 210-*j* about axes parallel to a plane associated with the planar coupling 225-*i*. The planar coupling 225-*j* includes compliant members 405-*a* and contact points having a contact plate 710 coupled to the third structure 215-*j* and spherical transfer bearings 715 coupled to the second structure 210-*j*. The combination of the contact plates 710 and the spherical transfer bearings 715 allows rolling contact between the second structure 210-*i* and the third structure 215. The rolling surface of each of the contact plates 710 may be parallel to each other, thereby defining the plane associated with the planar coupling 225-*j*. In the example of antenna mount 140-*j*, the rolling surface of each of the contact plates 710 is in the same plane.

The contact between the spherical transfer bearings 715 and the contact plates 710 may be associated with a compressive preload to maintain contact between the spherical transfer bearings 715 and the respective contact plates 710 through various system movements or vibrations, which may be provided by the compliant members 405-*a* (e.g., coil springs), which may be examples of compliant members 405 described with reference to FIG. 4. As the compliant members 405-*a* are coupled between the second structure 210-*j* and the third structure 215-*j*, the compliant members 405-*a* may be under a tensile preload to support the compressive preload between the spherical transfer bearings 715 and the contact plates 710 (e.g., the compressive preload of the planar coupling 225-*j*). The compliant members 405-*a* may be configured to maintain the compressive preload of the planar coupling 225-*j* through various relative movements between the second structure 210-*j* and third structure 215-*j*, and in some cases the compliant members 405-*a* may also provide a centering force between the second structure 210-*j* and the third structure 215-*j*.

The detailed description set forth above in connection with the appended drawings describes exemplary embodiments and does not represent the only embodiments that may be implemented or that are within the scope of the claims. The term "example" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

The foregoing description and claims may refer to elements or features as being "connected" or "coupled" together. As used herein, unless expressly stated otherwise, "connected" means that one element/feature is directly or indirectly connected to another element/feature. Likewise, unless expressly stated otherwise, "coupled" means that one element/feature is directly or indirectly coupled with another element/feature.

Thus, although the various schematics shown in the Figures depict example arrangements of elements and components, additional intervening elements, devices, features, or components may be present in an actual embodiment (assuming that the functionality of the depicted circuits is not adversely affected).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functions described herein may be implemented in various ways, with different materials, features, shapes, sizes, or the like. Other examples and implementations are within the scope of the disclosure and appended claims. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not to be limited to the examples and designs described herein but is to be accorded the widest scope consistent with the principles and novel features disclosed herein.

What is claimed is:

1. An apparatus, comprising:
   an antenna assembly comprising an alignment control system configured to position a direction of highest signal gain of the antenna assembly according to an elevation angle relative to a reference plane of the antenna assembly and an azimuth angle about an axis perpendicular to the reference plane; and
   an antenna mount coupled with the antenna assembly, the antenna mount comprising:
      a planar coupling configured to:
         permit translations between the alignment control system and a mounting structure of the antenna mount along a plurality of directions parallel to the reference plane; and
         prevent rotations between the alignment control system and the mounting structure of the antenna mount about a plurality of axes that are parallel to the reference plane; and
      a linear coupling configured to:
         permit translations between the alignment control system and the mounting structure of the antenna mount along a direction perpendicular to the reference plane; and
         prevent rotations between the alignment control system and the mounting structure of the antenna mount about the plurality of axes that are parallel to the reference plane.

2. The apparatus of claim 1, wherein the antenna mount is configured to:
   provide a centering force between the antenna assembly and the mounting structure of the antenna mount based at least in part on the translations between the antenna assembly and the mounting structure of the antenna mount along the plurality of directions parallel to the reference plane and the translations between the antenna assembly and the mounting structure of the antenna mount along the direction perpendicular to the reference plane.

3. The apparatus of claim 2, wherein the antenna mount is configured to:
   provide the centering force between the antenna assembly and the mounting structure of the antenna mount based at least in part on rotations between the antenna assembly and the mounting structure of the antenna mount about axes that are perpendicular to the reference plane.

4. The apparatus of claim 2, wherein the antenna mount is configured to:
   provide the centering force in accordance with a first stiffness parallel to the reference plane, and a second stiffness, different than the first stiffness, along the direction perpendicular to the reference plane.

5. The apparatus of claim 1, wherein the antenna mount is configured to:
   provide a damping force or a friction force between the antenna assembly and the mounting structure of the antenna mount based at least in part on the translations between the antenna assembly and the mounting structure of the antenna mount along the plurality of directions parallel to the reference plane and the translations between the antenna assembly and the mounting structure of the antenna mount along the direction perpendicular to the reference plane.

6. The apparatus of claim 5, wherein the antenna mount is configured to:
   provide the damping force or the friction force between the antenna assembly and the mounting structure of the antenna mount based at least in part on rotations between the antenna assembly and the mounting structure of the antenna mount about axes that are perpendicular to the reference plane.

7. The apparatus of claim 2, wherein the antenna mount is configured to support a first natural frequency between the antenna assembly and the mounting structure of the antenna mount along the plurality of directions parallel to the reference plane and a second natural frequency between the antenna assembly and the mounting structure of the antenna mount, different than the first natural frequency, along the direction perpendicular to the reference plane.

8. The apparatus of claim 1, wherein the antenna mount is further configured to:

prevent rotations between the alignment control system and the mounting structure of the antenna mount about axes that are perpendicular to the reference plane.

9. An apparatus, comprising:
an antenna assembly comprising an alignment control system configured to position a direction of highest signal gain of the antenna assembly according to an elevation angle relative to a reference plane of the antenna assembly and an azimuth angle about an axis perpendicular to the reference plane; and
an antenna mount coupled with the antenna assembly, the antenna mount configured to:
permit translations between the antenna assembly and a first structure of the antenna mount along directions parallel to the reference plane;
permit translations between the antenna assembly and the first structure of the antenna mount along a direction perpendicular to the reference plane;
prevent rotations between the antenna assembly and the first structure of the antenna mount about axes that are parallel to the reference plane;
prevent translations between the antenna assembly and a second structure of the antenna mount along the direction perpendicular to the reference plane;
permit translations between the antenna assembly and the second structure of the antenna mount along the directions parallel to the reference plane;
permit translations between the second structure of the antenna mount and the first structure of the antenna mount along the direction perpendicular to the reference plane; and
prevent translations between the second structure of the antenna mount and the first structure of the antenna mount along the directions parallel to the reference plane.

10. The apparatus of claim 9, wherein the antenna mount is configured to:
provide a preload force between the antenna assembly and the second structure of the antenna mount along the direction perpendicular to the reference plane.

11. The apparatus of claim 10, wherein the antenna mount is configured to:
provide a sliding contact or a rolling contact between the antenna assembly and the second structure of the antenna mount that is based at least in part on the preload force between the antenna assembly and the second structure of the antenna mount along the direction perpendicular to the reference plane.

12. The apparatus of claim 9, wherein the antenna mount is configured to:
prevent rotations between the antenna assembly and the second structure of the antenna mount about the axes that are parallel to the reference plane; and
prevent rotations between the second structure of the antenna mount and the first structure of the antenna mount about the axes that are parallel to the reference plane.

13. The apparatus of claim 9, wherein the antenna mount is configured to:
prevent rotations between the antenna assembly and the second structure of the antenna mount about axes that are perpendicular to the reference plane.

14. The apparatus of claim 9, wherein the antenna mount is configured to:

prevent rotations between the second structure of the antenna mount and the first structure of the antenna mount about axes that are perpendicular to the reference plane.

15. An apparatus, comprising:
an antenna assembly comprising an alignment control system configured to position a direction of highest signal gain of the antenna assembly according to an elevation angle relative to a reference plane of the antenna assembly and an azimuth angle about an axis perpendicular to the reference plane; and
an antenna mount coupled with the antenna assembly, the antenna mount configured to:
permit translations between the antenna assembly and a first structure of the antenna mount along directions parallel to the reference plane;
permit translations between the antenna assembly and the first structure of the antenna mount along a direction perpendicular to the reference plane;
prevent rotations between the antenna assembly and the first structure of the antenna mount about axes that are parallel to the reference plane;
permit translations between the antenna assembly and a second structure of the antenna mount along the direction perpendicular to the reference plane;
prevent translations between the antenna assembly and the second structure of the antenna mount along the directions parallel to the reference plane;
prevent translations between the second structure of the antenna mount and the first structure of the antenna mount along the direction perpendicular to the reference plane; and
permit translations between the second structure of the antenna mount and the first structure of the antenna mount along the directions parallel to the reference plane.

16. The apparatus of claim 15, wherein the antenna mount is configured to:
provide a preload force between the second structure of the antenna mount and the first structure of the antenna mount along the direction perpendicular to the reference plane.

17. The apparatus of claim 16, wherein the antenna mount is configured to:
provide a sliding contact or a rolling contact between the second structure of the antenna mount and the first structure of the antenna mount that is based at least in part on the preload force between the second structure of the antenna mount and the first structure of the antenna mount along the direction perpendicular to the reference plane.

18. The apparatus of claim 15, wherein the antenna mount is configured to:
prevent rotations between the antenna assembly and the second structure of the antenna mount about the axes that are parallel to the reference plane; and
prevent rotations between the second structure of the antenna mount and the first structure of the antenna mount about the axes that are parallel to the reference plane.

19. The apparatus of claim 15, wherein the antenna mount is configured to:
prevent rotations between the antenna assembly and the second structure of the antenna mount about the axis perpendicular to the reference plane.

20. The apparatus of claim 15, wherein the antenna mount is configured to:

prevent rotations between the second structure of the antenna mount and the first structure of the antenna mount about the axis perpendicular to the reference plane.

21. The apparatus of claim 1, wherein the planar coupling comprises:
   a first linear bearing aligned along a first direction parallel to the reference plane; and
   a second linear bearing aligned along a second direction parallel to the reference plane that is different than the first direction.

22. The apparatus of claim 1, wherein the planar coupling comprises one or more contact points provided with a compressive preload and providing a sliding contact or a rolling contact.

23. The apparatus of claim 22, wherein the planar coupling is configured such that, under extreme vibrations or extreme loading, the compressive preload is relieved and the one or more contact points temporarily lose contact.

* * * * *